United States Patent
Sawada et al.

(10) Patent No.: US 12,038,732 B2
(45) Date of Patent: Jul. 16, 2024

(54) MASTER DEVICE, ARITHMETIC PROCESSING DEVICE, PROGRAMMABLE LOGIC CONTROLLER, NETWORK, AND INFORMATION PROCESSING METHOD

(71) Applicant: OMRON Corporation, Kyoto (JP)

(72) Inventors: Shigenori Sawada, Takatsuki (JP); Norihiro Maekawa, Takatsuki (JP)

(73) Assignee: OMRON Corporation, Kyoto (JP)

( * ) Notice: Subject to any disclaimer, the term of this patent is extended or adjusted under 35 U.S.C. 154(b) by 436 days.

(21) Appl. No.: 17/440,197

(22) PCT Filed: Feb. 10, 2020

(86) PCT No.: PCT/JP2020/005143
§ 371 (c)(1),
(2) Date: Sep. 17, 2021

(87) PCT Pub. No.: WO2020/202803
PCT Pub. Date: Oct. 8, 2020

(65) Prior Publication Data
US 2022/0163939 A1    May 26, 2022

(30) Foreign Application Priority Data
Mar. 29, 2019    (JP) .............................. 2019-067208

(51) Int. Cl.
*G06F 15/16*    (2006.01)
*G05B 19/05*    (2006.01)
(Continued)

(52) U.S. Cl.
CPC ......... *G05B 19/054* (2013.01); *G05B 19/052* (2013.01); *H04L 12/42* (2013.01); *H04L 2012/421* (2013.01)

(58) Field of Classification Search
CPC ................ G05B 19/054; G05B 19/052; G05B 2219/14037; G05B 2219/14054;
(Continued)

(56) References Cited

U.S. PATENT DOCUMENTS 5,404,134 A * 4/1995 Jinzaki .................. H04L 12/433
                                                        370/245
6,912,678 B1 * 6/2005 Floro ..................... G01R 31/67
                                                        714/724
(Continued)

FOREIGN PATENT DOCUMENTS

| JP | 2012195653 | 10/2012 |
|----|------------|---------|
| JP | 2017153050 | 8/2017 |
| WO | 2015166332 | 11/2015 |

OTHER PUBLICATIONS

"International Search Report (Form PCT/ISA/210) of PCT/JP2020/005143," mailed on Apr. 28, 2020, with English translation thereof, pp. 1-4.
"Written Opinion of the International Searching Authority (Form PCT/ISA/237) of PCT/JP2020/005143," mailed on Apr. 28, 2020, with English translation thereof, pp. 1-6.
"Search Report of Europe Counterpart Application", issued on Nov. 25, 2022, pp. 1-10.

*Primary Examiner* — Thu V Nguyen
*Assistant Examiner* — Golam Mahmud
(74) *Attorney, Agent, or Firm* — JCIPRNET

(57) ABSTRACT

A master device manages a plurality of slave devices constituting a network including a ring topology. The plurality of slave devices includes: a first slave device serving as a starting point and a terminal point of the ring topology; and a plurality of second slave devices connected between a first output port of the first slave device and a second output port thereof and constituting the ring topology. On the basis of a network configuration detected when the second output port (Continued)

and the output port of a second slave device paired with the second output port are available and of a network configuration detected when the second output port and the output port paired therewith have been made unavailable, the master device determines an incorrect wiring path between the first output port and the second output port and outputs information indicating the incorrect wiring path to an information processing device.

20 Claims, 32 Drawing Sheets

(51) Int. Cl.
*H04L 12/24* (2006.01)
*H04L 12/26* (2006.01)
*H04L 12/42* (2006.01)

(58) Field of Classification Search
CPC .......... G05B 19/058; H04L 12/42; H04L 2012/421; H04L 12/40; H04L 12/423; H04L 41/0806; H04L 2012/4026; H04L 41/0853; H04L 41/12; H04L 41/22
See application file for complete search history.

(56) References Cited

U.S. PATENT DOCUMENTS

| | | | |
|---|---|---|---|
| 8,072,999 B1* | 12/2011 | Cline | H04L 12/437 370/431 |
| 8,990,423 B2* | 3/2015 | Voigt | H04L 41/08 709/224 |
| 9,680,691 B2* | 6/2017 | Tahara | H04L 41/0677 |
| 2003/0223376 A1* | 12/2003 | Elliott | H04J 3/1611 370/249 |
| 2007/0094410 A1* | 4/2007 | Voigt | H04L 43/0811 709/237 |
| 2007/0204068 A1* | 8/2007 | Oku | H04L 12/66 709/224 |
| 2007/0283042 A1* | 12/2007 | West | H04L 65/80 709/238 |
| 2012/0106387 A1 | 5/2012 | Nakamura et al. | |
| 2013/0211552 A1* | 8/2013 | Gomez | H04L 12/40202 700/20 |
| 2014/0047056 A1 | 2/2014 | Tahara et al. | |
| 2014/0122631 A1 | 5/2014 | Tahara et al. | |
| 2017/0264455 A1* | 9/2017 | Ozaki | H04L 67/125 |
| 2019/0278351 A1* | 9/2019 | Ueda | G06F 1/28 |

\* cited by examiner

200

230

☐ acquire information wiring is not correct. please correct wiring and then perform re-execution

| | slave | |
|---|---|---|
| | 59:GX-JC06(IN,X2,X3) Main device Rev:1.0 | |
| | 58:GX-JC06(X4,X5,X6) Sub-device Rev:1.0 | |
| ① | 6:SEC-Z507 Rev:0x0000000C | |

OUT ports are connected to each other. port: port B
please correct wiring so that IN port and OUT port are connected.
when connected to terminal point port of ring, please confirm whether or not disconnection has occurred in ring topology and correct wiring.

[ re-execute ]   [ close ]

FIG. 22

| | |
|---|---|
| vendor ID | ID of manufacturing company of slave |
| product code | code indicating product type managed by manufacturing company of slave |
| revision | version of product managed by manufacturing company of slave |
| serial number | serial number of product managed by manufacturing company of slave |
| slave ID | ID for identifying slave (ID can be set for slave from hardware SW or dedicated tool) |
| PHY link information | information on link-on/link-off and open/close of PHY of each port of slave |
| node address | address for communication which is set for slave by master |
| time stamp of port | time at which time stamp frame has passed through each port |

FIG. 24

| slave #1 | slave #2 | slave #3 | slave #4 |
|---|---|---|---|
| VendorId:0x0083 | VendorId:0x0083 | VendorId:0x0083 | VendorId:0x0083 |
| ProductCode:0x0021 | ProductCode:0x0001 | ProductCode:0x0021 | ProductCode:0x0001 |
| Revision:0x0101 | Revision:0x0101 | Revision:0x0101 | Revision:0x0101 |
| SerialNumber:0x0100 | SerialNumber:0x0203 | SerialNumber:0x0067 | SerialNumber:0x0304 |
| Slave ID:0x0001 | Slave ID:0x0002 | Slave ID:0x0003 | Slave ID:0x0004 |
| Port A:LINK/OPEN | Port A:LINK/OPEN | Port A:LINK/OPEN | Port A:LINK/OPEN |
| Port B:LINK/OPEN | Port B:LINK/OPEN | Port B:LINK/OPEN | Port B:NOLINK/CLOSE |
| Port C:LINK/OPEN | Port C:NOLINK/CLOSE | Port C:LINK/OPEN | Port C:NOLINK/CLOSE |
| Port D:NOLINK/CLOSE | Port D:NOLINK/CLOSE | Port D:NOLINK/CLOSE | Port D:NOLINK/CLOSE |
| NodeAddress:0x0000 | NodeAddress:0x0000 | NodeAddress:0x0000 | NodeAddress:0x0000 |
| Time A:0x000A | Time A:0x0014 | Time A:0x000A | Time A:0x0028 |
| Time B:0x0000 | Time B:0x0000 | Time B:0x0032 | Time B:0x0000 |
| Time C:0x000C | Time C:0x0000 | Time C:0x0000 | Time C:0x0000 |
| Time D:0x0000 | Time D:0x0000 | Time D:0x0000 | Time D:0x0000 |

FIG. 26

| slave #1 | slave #2 | slave #3 | slave #4 |
|---|---|---|---|
| VendorId:0x0083 | VendorId:0x0083 | VendorId:0x0083 | VendorId:0x0083 |
| ProductCode:0x0021 | ProductCode:0x0001 | ProductCode:0x0021 | ProductCode:0x0001 |
| Revision:0x0101 | Revision:0x0101 | Revision:0x0101 | Revision:0x0101 |
| SerialNumber:0x0100 | SerialNumber:0x0203 | SerialNumber:0x0067 | SerialNumber:0x0304 |
| Slave ID:0x0001 | Slave ID:0x0002 | Slave ID:0x0003 | Slave ID:0x0004 |
| Port A:LINK/OPEN | Port A:LINK/OPEN | Port A:LINK/OPEN | Port A:LINK/OPEN |
| Port B:LINK/OPEN | Port B:LINK/OPEN | Port B:LINK/OPEN | Port B:NOLINK/CLOSE |
| Port C:LINK/CLOSE | Port C:NOLINK/CLOSE | Port C:LINK/CLOSE | Port C:NOLINK/CLOSE |
| Port D:NOLINK/CLOSE | Port D:NOLINK/CLOSE | Port D:NOLINK/CLOSE | Port D:NOLINK/CLOSE |
| NodeAddress:0x0000 | NodeAddress:0x0000 | NodeAddress:0x0000 | NodeAddress:0x0000 |
| Time A:0x000A | Time A:0x0014 | Time A:0x000A | Time A:0x0028 |
| Time B:0x0046 | Time B:0x003C | Time B:0x0032 | Time B:0x0000 |
| Time C:0x0000 | Time C:0x0000 | Time C:0x0000 | Time C:0x0000 |
| Time D:0x0000 | Time D:0x0000 | Time D:0x0000 | Time D:0x0000 |

| slave #1 | slave #3 | slave #4 |
|---|---|---|
| VendorId:0x0083 | VendorId:0x0083 | VendorId:0x0083 |
| ProductCode:0x0021 | ProductCode:0x0021 | ProductCode:0x0001 |
| Revision:0x0101 | Revision:0x0101 | Revision:0x0101 |
| SerialNumber:0x0100 | SerialNumber:0x0067 | SerialNumber:0x0304 |
| Slave ID:0x0001 | Slave ID:0x0003 | Slave ID:0x0004 |
| Port A:LINK/OPEN | Port A:LINK/OPEN | Port A:LINK/OPEN |
| Port B:LINK/OPEN | Port B:LINK/OPEN | Port B:NOLINK/CLOSE |
| Port C:LINK/OPEN | Port C:LINK/OPEN | Port C:NOLINK/CLOSE |
| Port D:NOLINK/CLOSE | Port D:NOLINK/CLOSE | Port D:NOLINK/CLOSE |
| NodeAddress:0x0000 | NodeAddress:0x0000 | NodeAddress:0x0000 |
| Time A:0x000A | Time A:0x000A | Time A:0x0028 |
| Time B:0x0000 | Time B:0x0032 | Time B:0x0000 |
| Time C:0x003C | Time C:0x0000 | Time C:0x0000 |
| Time D:0x0000 | Time D:0x0000 | Time D:0x0000 |

FIG. 30

| slave #1 | slave #2 | slave #3 | slave #4 |
|---|---|---|---|
| VendorId:0x0083 | VendorId:0x0083 | VendorId:0x0083 | VendorId:0x0083 |
| ProductCode:0x0021 | ProductCode:0x0001 | ProductCode:0x0021 | ProductCode:0x0001 |
| Revision:0x0101 | Revision:0x0101 | Revision:0x0101 | Revision:0x0101 |
| SerialNumber:0x0100 | SerialNumber:0x0203 | SerialNumber:0x0067 | SerialNumber:0x0304 |
| Slave ID:0x0001 | Slave ID:0x0002 | Slave ID:0x0003 | Slave ID:0x0004 |
| Port A:LINK/OPEN | Port A:LINK/OPEN | Port A:LINK/OPEN | Port A:LINK/OPEN |
| Port B:LINK/OPEN | Port B:LINK/OPEN | Port B:LINK/OPEN | Port B:NOLINK/CLOSE |
| Port C:LINK/CLOSE | Port C:NOLINK/CLOSE | Port C:LINK/CLOSE | Port C:NOLINK/CLOSE |
| Port D:NOLINK/CLOSE | Port D:NOLINK/CLOSE | Port D:NOLINK/CLOSE | Port D:NOLINK/CLOSE |
| NodeAddress:0x0000 | NodeAddress:0x0000 | NodeAddress:0x0000 | NodeAddress:0x0000 |
| Time A:0x000A | Time A:0x003C | Time A:0x000A | Time A:0x0028 |
| Time B:0x0046 | Time B:0x0014 | Time B:0x0032 | Time B:0x0000 |
| Time C:0x0000 | Time C:0x0000 | Time C:0x0000 | Time C:0x0000 |
| Time D:0x0000 | Time D:0x0000 | Time D:0x0000 | Time D:0x0000 |

FIG. 32

MASTER DEVICE, ARITHMETIC PROCESSING DEVICE, PROGRAMMABLE LOGIC CONTROLLER, NETWORK, AND INFORMATION PROCESSING METHOD

CROSS-REFERENCE TO RELATED APPLICATION

This application is a 371 application of the international PCT application serial no. PCT/JP2020/005143, filed on Feb. 10, 2020, which claims the priority benefit of Japan application no. 2019-067208, filed on Mar. 29, 2019. The entirety of each of the above-mentioned patent applications is hereby incorporated by reference herein and made a part of this specification.

TECHNICAL FIELD

The present invention relates to a master device, an arithmetic processing device, a programmable logic controller, a network, and an information processing method.

BACKGROUND ART

Hitherto, various types of networks constituted by master devices and slave devices have become known. As also disclosed in, for example, Japanese Patent Laid-Open No. 2017-153050 (Patent Literature 1), such networks can adopt various types of connection forms such as a line topology (daisy chain), a ring topology, a tree topology, and a star topology.

CITATION LIST

Patent Literature

Patent Literature 1

Japanese Patent Laid-Open No. 2017-153050

SUMMARY OF INVENTION

Technical Problem

When slave devices are connected to each other through wiring in the above-described networks, the slave device may be erroneously connected in a manner different from that in an intended network configuration.

In particular, in a network including ring topology, even when an incorrect path is present in the network, a master device may not be able to detect the incorrect path. In this case, a user (an administrator, an operator, or the like) of the network may not be able to ascertain which path is incorrect with only information from the master device. For this reason, the user may need to check wirings one by one at the site.

The present disclosure is contrived in view of the above-described problems, and an objective thereof is to provide a master device, an arithmetic processing device, a programmable logic controller, a network, and an information processing method by which an incorrect path in a network including ring topology can be easily ascertained.

Solution to Problem

According to an aspect of the present disclosure, a master device manages a plurality of slave devices constituting a network including a ring topology. The plurality of slave devices include a first slave device serving as a starting point and a terminal point of the ring topology, and a plurality of second slave devices which are connected between a first output port and a second output port of the first slave device and constitute the ring topology. The master device includes detection part for detecting a configuration of the network on the basis of communication with the plurality of slave devices, port control part for invalidating the second output port and an output port of the second slave device which is paired with the second output port, specification part for specifying an incorrect wiring path between the first output port and the second output port on the basis of a configuration of the network detected when the second output port and the output port of the second slave device which is paired with the second output port are valid, and a configuration of the network detected when the second output port and the output port of the second slave device which is paired with the second output port are invalidated, and output part for outputting information indicating the specified incorrect wiring path to an information processing device outside the master device.

Preferably, the first output port and the second output port are output ports of the first slave device. The first output port is a starting point port of the ring topology, and the second output port is a terminal point port of the ring topology.

Preferably, the detection part detects a configuration of the network using predetermined detection data. The detection data includes first data and second data for acquiring time stamp information indicating a time at which the first data has passed through the plurality of second slave devices from each of the second slave devices.

Preferably, the detection part transmits the detection data on a condition that the master device has been started up.

Preferably, the detection part transmits the detection data on a condition that it has been detected that new equipment has been added to the network.

Preferably, one of the plurality of second slave devices is a branch slave device including an input port and a plurality of output ports, and the second slave device and a third slave device that does not constitute the ring topology are able to be connected to each of the plurality of output ports. In a case where an incorrect wiring path is not present, information of the third slave device is included in the configuration of the network detected when the second output port and the output port of the second slave device which is paired with the second output port are valid, and the configuration of the network detected when the second output port and the output port of the second slave device which is paired with the second output port are invalidated. In a case where an incorrect wiring path is present, the information of the third slave device is not included in the configuration of the network detected when the second output port and the output port of the second slave device which is paired with the second output port are valid, and the information of the third slave device is included in the configuration of the network detected when the second output port and the output port of the second slave device which is paired with the second output port are invalidated.

Preferably, one slave device among the second slave devices connected to each other through wirings is positioned closer to a starting point side of the ring topology than the other slave device. In a case where a wiring path connecting the other slave device and the one slave device is not incorrect, information of the one slave device and information of the other slave device are included in the configuration of the network detected when the second output port and the output port of the second slave device which is paired with the second output port are valid and the configuration of the network detected when the second output port and the output port of the second slave device which is paired with the second output port are invalidated. In a case where the wiring path connecting the other slave device and the one slave device is incorrect, the information of the one slave device is not included in the configuration of the network detected when the second output port and the output port of the second slave device which is paired with the second output port are valid, and the information of the one slave device and the information of the other slave device are included in the configuration of the network detected when the second output port and the output port of the second slave device which is paired with the second output port are invalidated.

Preferably, the network is an EtherCAT network.

According to another disclosure of the present invention, an arithmetic processing device includes the above-described master device.

According to still another disclosure of the present invention, a programmable logic controller includes a hardware unit of the above-described arithmetic processing device.

According to still another disclosure of the present invention, a network includes a ring topology. The network includes a plurality of slave devices that constitutes the network, a master device that manages the plurality of slave devices, and an information processing device that is communicatively connected to the master device. The plurality of slave devices includes a first slave device serving as a starting point and a terminal point of the ring topology, and a plurality of second slave devices which are connected between a first output port and a second output port of the first slave device and constitute the ring topology. The master device detects a configuration of the network on the basis of communication with the plurality of slave devices, is able to invalidate the second output port and an output port of the second slave device which is paired with the second output port, and specifies an incorrect wiring path between the first output port and the second output port on the basis of a configuration of the network detected when the second output port and the output port of the second slave device which is paired with the second output port are valid, and a configuration of the network detected when the second output port and the output port of the second slave device which is paired with the second output port are invalidated. The master device outputs information indicating the specified incorrect wiring path to the information processing device. The information processing device displays the incorrect wiring path.

According to still another disclosure of the present invention, an information processing method is executed in a master device that manages a plurality of slave devices constituting a network including a ring topology. The plurality of slave devices includes a first slave device serving as a starting point and a terminal point of the ring topology, and a plurality of second slave devices which are connected between a first output port and a second output port of the first slave device and constitute the ring topology. The information processing method includes a step of causing the master device to detect a configuration of the network on the basis of communication with the plurality of slave devices, a step of causing the master device to invalidate the second output port and an output port of the second slave device which is paired with the second output port, a step of causing the master device to specify an incorrect wiring path between the first output port and the second output port on the basis of a configuration of the network detected when the second output port and the output port of the second slave device which is paired with the second output port are valid, and a configuration of the network detected when the second output port and the output port of the second slave device which is paired with the second output port are invalidated, and a step of causing the master device to output information indicating the specified incorrect wiring path to an information processing device outside the master device.

Advantageous Effects of Invention

According to the above-described disclosures, it is possible to easily ascertain an incorrect path in a network including a ring topology.

BRIEF DESCRIPTION OF DRAWINGS

FIG. 22 is a diagram showing a screen displayed in a support device in a case where detection data flows to a network in the state of FIG. 20 and data flows to a network in the state of FIG. 21.

FIG. 24 is a diagram showing slave information managed by a master.

FIG. 26 is a diagram showing data of slaves managed by a master in a network having a connection relationship shown in FIG. 25.

FIG. 28 is a diagram showing data of slaves managed by a master in a network having a connection relationship shown in FIG. 27.

FIG. 30 is a diagram showing data of slaves managed by a master in a network having a connection relationship shown in FIG. 29.

FIG. 32 is a diagram showing data of slaves managed by a master in a network having a connection relationship shown in FIG. 31.

DESCRIPTION OF EMBODIMENTS

Figure 1:
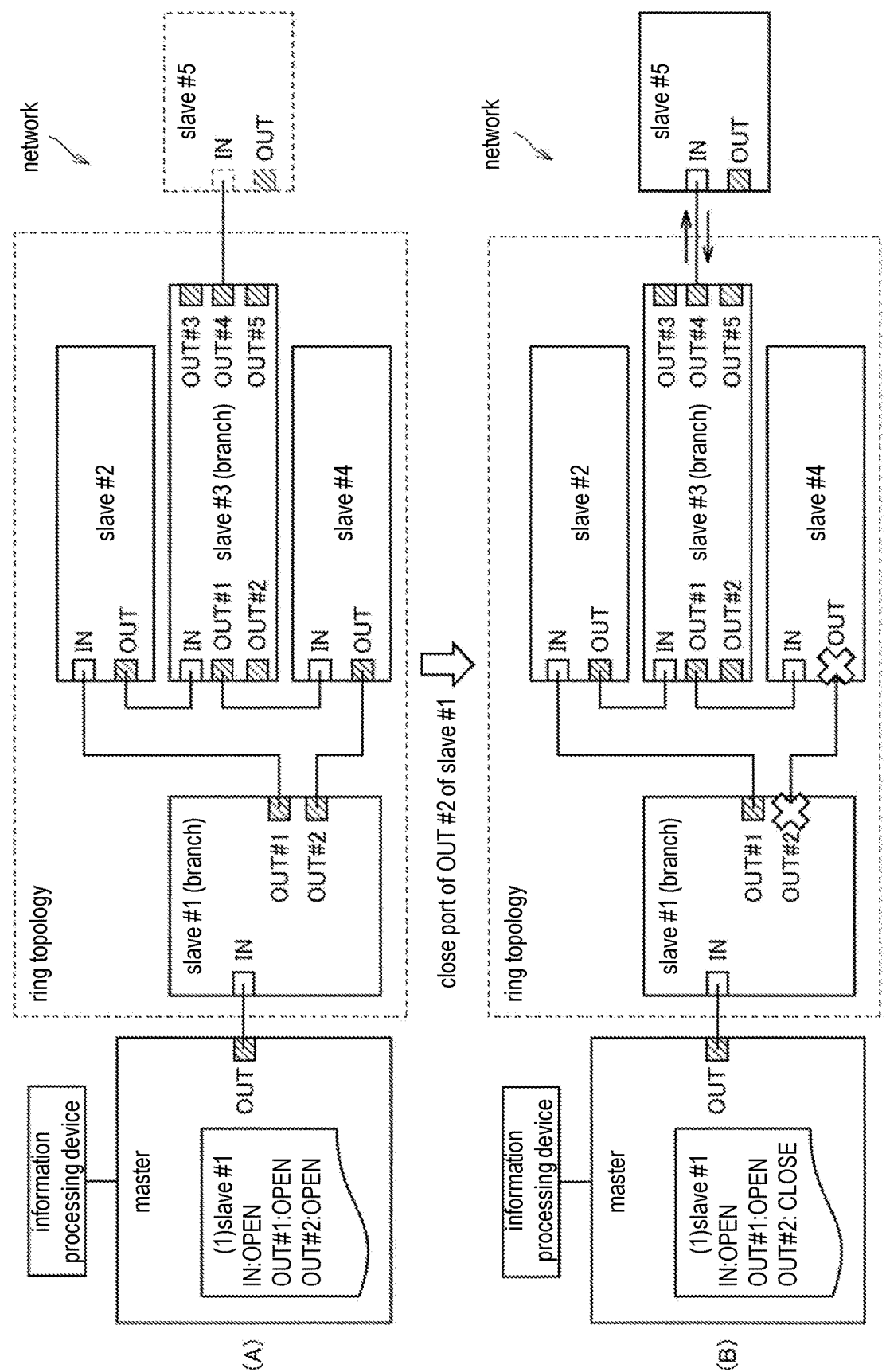
FIG. 1 is a diagram showing the state of a network.

Hereinafter, an embodiment of the present invention will be described with reference to the drawings. In the following description, the same components are denoted by the same reference numerals and signs. These components have the same names and functions. Thus, detailed description thereof will not be repeated.

Meanwhile, hereinafter, a master device will be referred to as a "master", and a slave device will be referred to as a "slave". The slave includes an input port and an output port. In the drawings, for convenience of description, an input port will be referred to as an "IN port" or simply as an "IN", and an output port will be referred to as an "OUT port" or simply as an "OUT".

In addition, hereinafter, an incorrect wiring path indicates a communication path generated by erroneous wiring of a user (an operator or the like). Specifically, the incorrect wiring path indicates a path that does not conform to network configuration information stored in a master.

Meanwhile, the network configuration information is created in advance by a user via an information processing device connected to a master and is transmitted to the master. In this manner, the network configuration information indicates a user's intended network configuration. In detail, the network configuration information includes information for identifying a device connected to a network.

Information for specifying a configuration connected in a network is stored in the network configuration information. For example, information indicating that a network is configured by a master (programmable logic controller), a slave connected to the master, and the like may be stored in the network configuration information. The network configuration information includes information such as a connection relationship between the master and the slave.

§ 1 Application Example

FIG. 1 is a diagram showing the state of a network.

As illustrated in FIG. 1, the network (network system) is constituted by a master and a plurality of slaves. The master manages a plurality of slaves #1 to #5 that constitutes a network including a ring topology. In addition, the master is communicatively connected to an external information processing device.

The slave #1 is a slave serving as a starting point and a terminal point of a ring topology. The slaves #2 to #4 are connected between an output port #1 and an output port #2 of the slave #1 and constitute a ring topology. Meanwhile, the slave #5 does not constitute a ring topology.

In addition, the slave #1 is also a slave constituting a ring topology. In detail, regarding the slave #1, it can be said that the output port #1 and the output port #2 constitute a ring topology, and an input port of the slave #1 does not constitute a ring topology.

In a state (A), an incorrect wiring path is present between the output port #1 and the output port #2. In the slave #3, data which is input to the input port is output from the output port #1. As a result, the data does not reach the slave #5 and is input to the slave #4. Thereafter, the data returns to the slave #1.

In slave #3, when wiring (cable) is connected to a plurality of output ports, data is output from an output port having the smallest number among the output ports to which the wiring is connected. For example, in the state (A), wiring is connected to the output port #1 and an output port #4, and thus data is output from the output port #1.

In this manner, in the state (A), the master cannot communicate with the slave #5, and thus the master cannot recognize the slave #5. Thus, in this case, the master detects a configuration of a network including the slaves #1 to #4.

Next, as shown in a state (B), the master invalidates an output port of the slave #4 (that is, an output port of the slave #4 which is paired with the output port #2 of the slave #1) and the output port #2 of the slave #1. That is, the master transfers the state of the output port of the slave #4 and the output port #2 of the slave #1 from an open state to a close state. When the output port of the slave #4 is invalidated, data which is input to an input port of the slave #4 is not output from the output port of the slave #4. Thereafter, the data is transmitted to the input port of the slave #4 and is input from the input port to an output port #1 of the slave #3.

Since wiring is not connected to the output ports #2 and #3 of the slave #3, data which is input to the output port #1 of the slave #3 is output from the output port #4. As a result, data is input to an input port of the slave #5. Thereafter, the data is output from an output port of the slave #5 and is input to the output port #4 of the slave #3. Further, the data is transmitted from the input port of the slave #3 to the output port of the slave #2, and is then transmitted from the input port of the slave #2 to the output port #1 of the slave #1.

In this manner, the master can recognize the slave #5 by invalidating the output port of the slave #4 and the output port #2 of the slave #1. Thus, in this case, the master detects a configuration of a network including the slaves #1 to #5.

In this manner, the master can detect the presence of the slave #5. Thereby, the master can detect that a wiring path of the slave #5 for the slave #3 is incorrect. In addition, the master can also detect that a wiring path of the slave #4 for the slave #3 is incorrect.

As described above, the master specifies an incorrect wiring path between the output port #1 and the output port #2 of the slave #1 on the basis of a configuration of a network detected when the output port #2 of the slave #1 and the output port of the slave #4 which is paired with the output port #2 of the slave #1 are valid, and a configuration of a network detected when the output port #2 of the slave #1 and the output port of the slave #4 which is paired with the output port #2 of the slave #1 are invalidated. Meanwhile, the "pair" can also be said to be a combination of ports that are directly connected to each other through a cable.

Thus, the master outputs information indicating the specified incorrect wiring path to an information processing device, and thus a user (an administrator, an operator, or the like) of a network can ascertain an incorrect path in a network including a ring topology. Thereby, even when a network configuration obtained by the master is a network configuration which is not intended by the user as in the state (A), the user does not need to check wirings one by one at the site.

§ 2 Configuration Example

<A. Configuration of Network>

Figure 2:
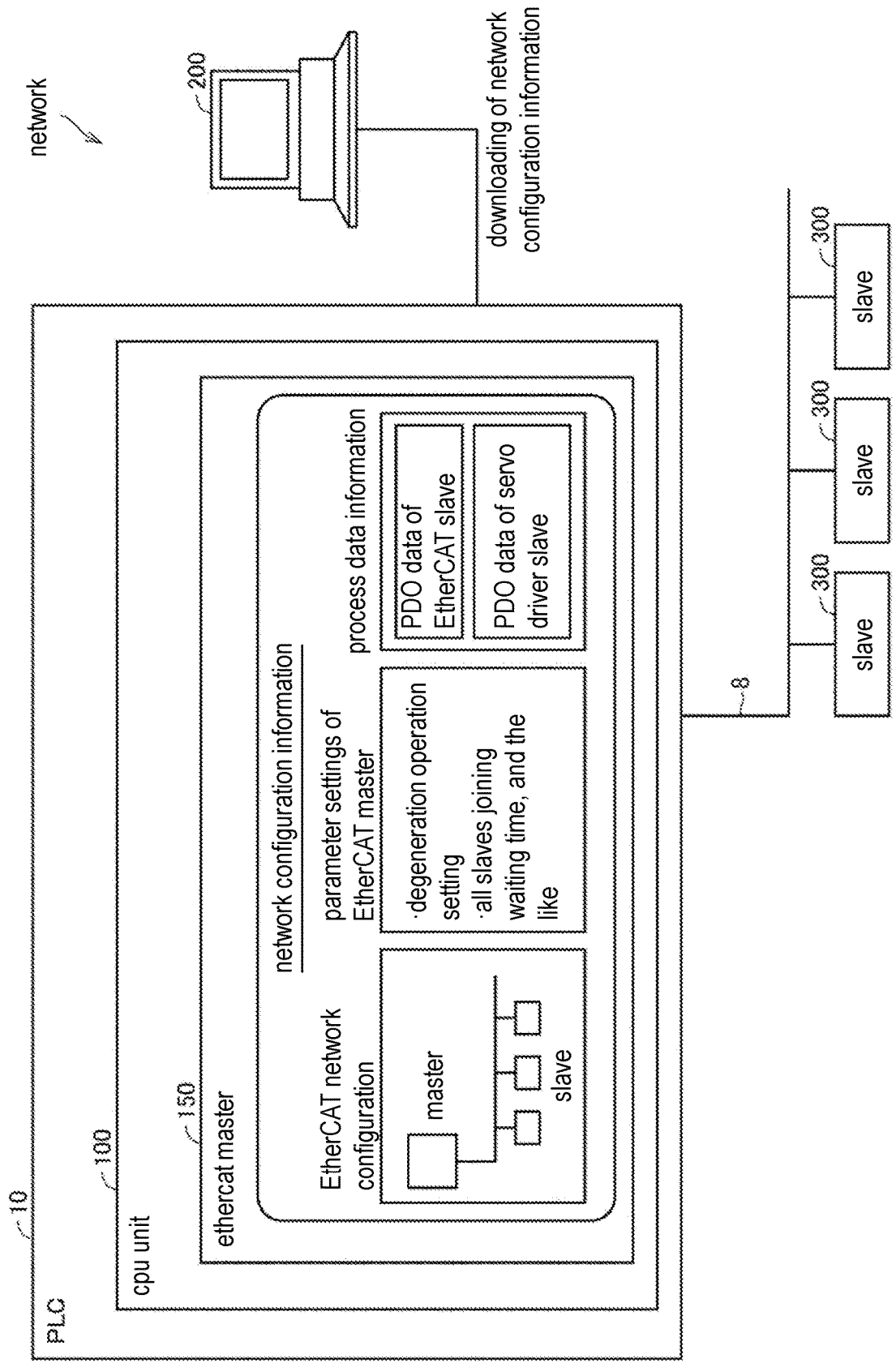
FIG. 2 is a diagram showing a configuration of a network.

FIG. 2 is a diagram showing a configuration of a network.

Referring to FIG. 2, a network (network system) 1 includes a programmable logic controller (PLC) 10 which is a control device, a support device 200 as an information processing device, and a plurality of slaves 300. The PLC 10 includes a central processing unit (CPU) unit 100 as an arithmetic processing device. The CPU unit 100 includes a master 150 of EtherCAT (registered trademark). The master 150 acquires network configuration information created in advance in the support device 200 from the support device 200 and stores the acquired network configuration information. In the network configuration information, a network configuration of EtherCAT, parameter settings of a master of EtherCAT, process data, and the like are stored.

The plurality of slaves 300 is connected to the PLC 10 (typically, a master 150) by a local area network (LAN) cable 8 corresponding to EtherCAT.

Meanwhile, hereinafter, a master and a slave are equipment based on EtherCAT communication.

<B. Hardware Configuration Example of PLC 10>

Figure 3:
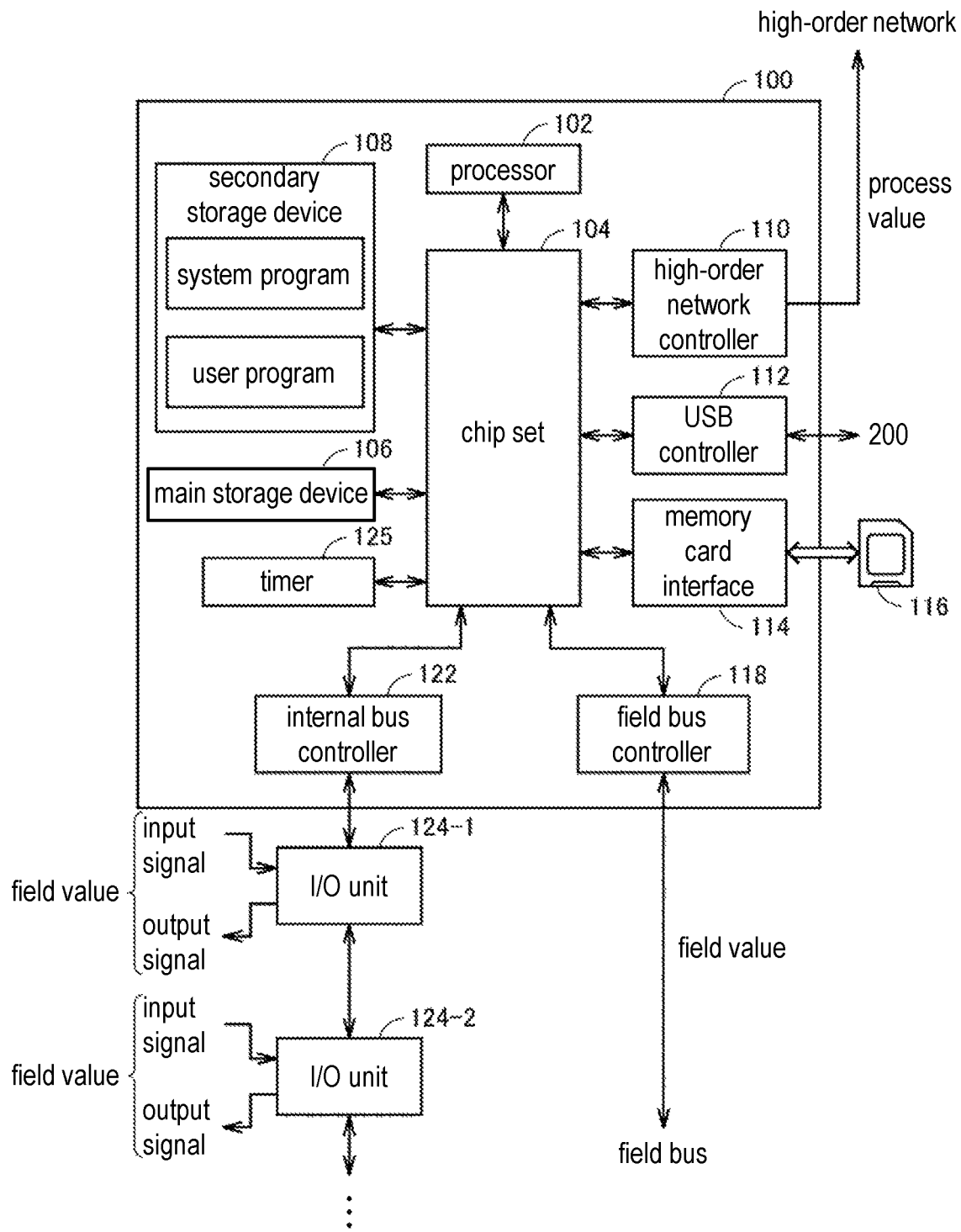
FIG. 3 is a block diagram showing a hardware configuration example of a PLC.

FIG. 3 is a block diagram showing a hardware configuration example of the PLC 10. Referring to FIG. 3, the PLC 10 includes a CPU unit 100 and one or a plurality of I/O units 124-1, 124-2, . . . .

The CPU unit 100 includes a processor 102, a chip set 104, a main storage device 106, and a secondary storage device 108. In addition, the CPU unit 100 includes a high-order network controller 110, a universal serial bus (USB) controller 112, and a memory card interface 114. Further, the CPU unit 100 includes an internal bus controller 122, a field bus controller 118, and a timer 125.

The processor 102, which is constituted by a central processing unit (CPU), a micro-processing unit (MPU), or the like, reads various programs stored in the secondary storage device 108 and expands the programs to the main storage device 106 to execute the programs. The processor 102 expands the various programs to the main storage device 106 to realize control corresponding to a control target and various processes. The chip set 104 controls the processor 102 and each device to realize processing for the entire PLC 10.

In the secondary storage device 108, a system program and a user program 152 are stored.

The high-order network controller 110 controls the exchange of data with other devices through a high-order network. More specifically, the high-order network controller 110 transmits a process value to, for example, an external device.

The USB controller 112 controls the exchange of data with the support device 200 through a USB connection.

The memory card interface 114 is configured such that a memory card 116 is detachable, and is configured such that data can be written in the memory card 116 and various data (a user program 152, trace data, and the like) can be read from the memory card 116.

The internal bus controller 122 is an interface that exchanges data with the I/O units 124-1, 124-2, . . . mounted on the PLC 10.

The field bus controller 118 controls the exchange of a feed value with other devices through a field bus (field network). In the present example, the field bus controller 118 functions as the above-described master. For example, a microprocessor (not shown) inside the field bus controller 118 executes firmware, and thus the field bus controller 118 functions as a master. Alternatively, in an application specific integrated circuit (ASIC) in the field bus controller 118, the field bus controller 118 functions as a master.

Meanwhile, the present invention is not limited thereto, and a system program of the secondary storage device 108 may perform a function as a master. Alternatively, the support device 200 may function as a master.

FIG. 3 shows a configuration example in which necessary functions are provided by the processor 102 executing programs, but some or all of the provided functions may be installed using a dedicated hardware circuit (for example, an application specific integrated circuit (ASIC), a field-programmable gate array (FPGA), or the like). Alternatively, a main portion of the PLC 10 may be realized using hardware (for example, an industrial PC based on a general-purpose personal computer) that follows general-purpose architecture. In this case, a plurality of operating systems (OSs) having different uses may be executed in parallel, and necessary applications may be executed on the OSs by using virtualization technology.

<C. Structure of Data and Flow of Data>

Hereinafter, data input from an output port of one slave, out of two slaves connected to each other through a cable, to an input port of the other slave will also be referred to as an "input from OUT to IN". In addition, data input from an input port of one slave, out of two slaves connected to each other through a cable, to an output port of the other slave will also be referred to as an "input from IN to OUT" below.

Further, data input from an input port of one slave, out of two slaves connected to each other through a cable, to an input port of the other slave will also be referred to as an "input from IN to IN". In addition, data input from an output port of one slave, out of two slaves connected to each other through a cable, to an output port of the other slave will also be referred to as an "input from OUT to OUT".

In addition, determining which one of these four modes a connection mode between two slaves connected to each other through a cable is will also be referred to as "IN-OUT relationship determination". Meanwhile, the determination is executed by the master 150. Meanwhile, as indicated by an arrow in the state (B) of FIG. 1, focusing on a relationship between the slave #3 and the slave #5, an "input from OUT to IN" and an "input from IN to OUT" are performed.

Figure 4:
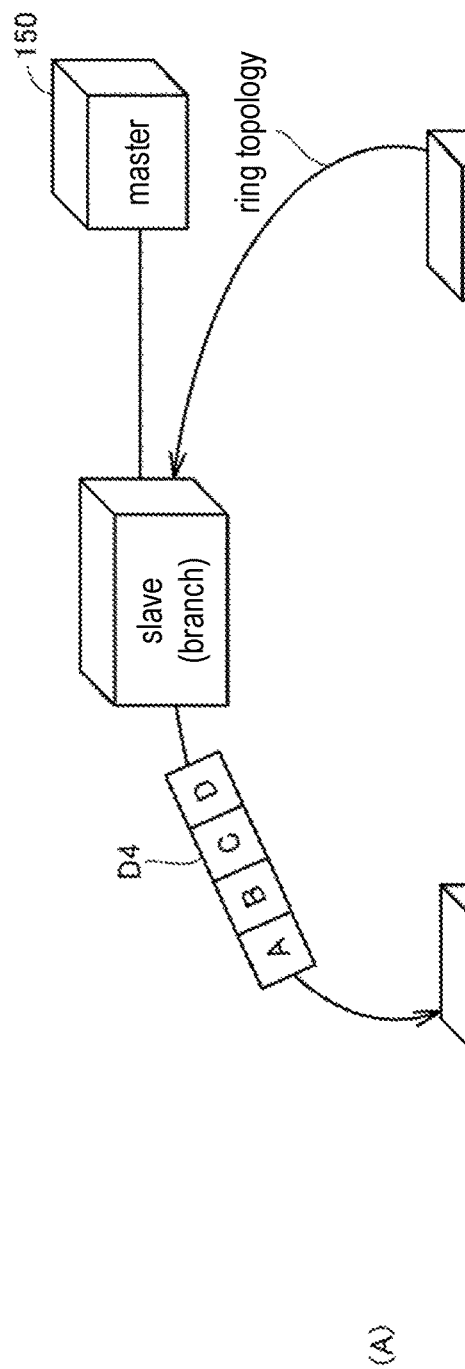
FIG. 4 is a diagram showing data in a ring topology.

FIG. 4 is a diagram showing data in a ring topology. (A) of FIG. 4 is a diagram showing a flow of data of a ring topology. (B) of FIG. 4 is a diagram showing a structure of data (in detail, frame data). Referring to (A) of FIG. 4, the master 150 outputs data D4 such as process data.

The data D4 passes through a branch slave Z, a slave A, a slave B, a slave C, a slave D, and a slave Z in this order via a field network (EtherCAT) and returns to the master 150. Meanwhile, the signs of A, B, C, and D in the data D4 of (A) of FIG. 4 indicate data regarding the slave A, data regarding the slave B, data regarding the slave C, and data regarding the slave D, respectively.

Referring to (B) of FIG. 4, the data D4 includes a region in which OUT data of the slave A is stored, a region in which OUT data of the slave B is stored, a region in which OUT data of the slave C is stored, and a region in which OUT data of the slave Dis stored. Further, the data D4 includes a region in which IN data of the slave A is stored, a region in which IN data of the slave B is stored, a region in which IN data of the slave C is stored, and a region in which IN data of the slave D is stored.

In the region in which the OUT data of the slave A is stored, data acquired (read) by the slave A is written by the master 150. In addition, similarly, in the regions in which the pieces of OUT data of the slaves B, C, and D are stored, pieces of data acquired by the slaves B, C. and D are written.

Further, in the region in which the IN data of the slave A is stored, data taken in from a device such as a sensor by the slave A is written. In addition, similarly, in the regions in which the pieces of IN data of the slaves B, C, and D are stored, pieces of data taken in from a device such as a sensor by the slaves B, C. and D are written.

Meanwhile, the master 150 transmits detection data to be described later to a network with a data structure similar to that of the data D4.

Figure 5:
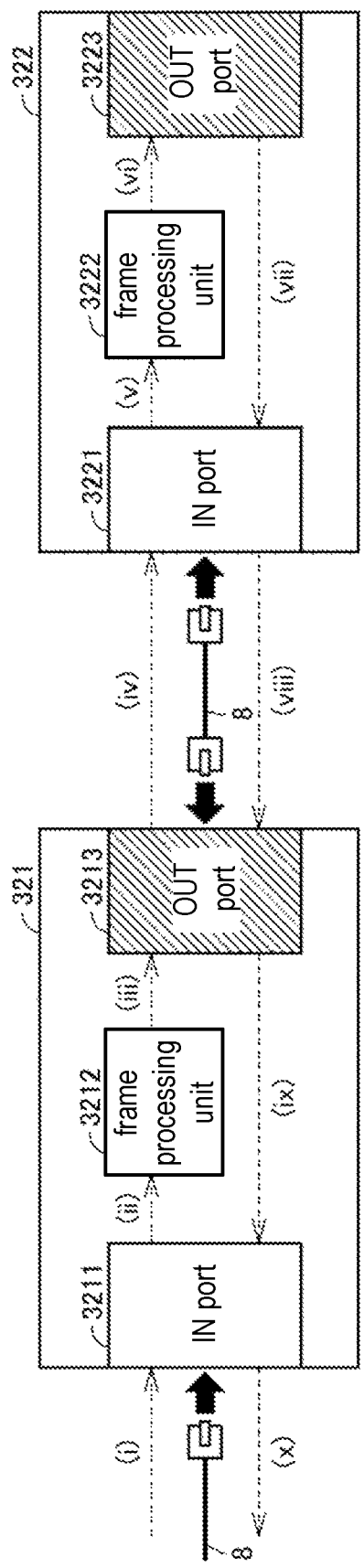
FIG. 5 is a diagram showing a flow of data in a line topology.

FIG. 5 is a diagram showing a flow of data in a line topology.

Referring to FIG. 5, a dashed arrow indicates a flow (path) of data (in detail, frame data). In addition, numbers ((i), (ii). (iii), . . . ) above and below dashed arrows indicate the order of the flow of the data (the order of the path). Hereinafter, for convenience of description, the case of a path (i) or the like indicates a path having a number (i). This is the same as in other drawings of FIG. 9 and the like.

When data is input to an input port 3211 of a slave 321 (see (i)), data is transmitted from the input port 3211 to a data processing unit 3212 (see (ii)). The data processing unit 3212 performs predetermined processing on the received data. Thereafter, the data processing unit 3212 transmits the processed data to an output port 3213 (see (iii)).

The data is transmitted from the output port 3213 to a slave 322 through the cable 8. The data is input to an input port 3221 of the slave 322 (see (iv)). When the data is input to the input port 3221 of the slave 322, the data is transmitted from the input port 3221 to a data processing unit 3222 (see (v)). The data processing unit 3222 performs predetermined processing on the received data. Thereafter, the data processing unit 3222 transmits the processed data to an output port 3223 (see (vi)).

Thereafter, the data is transmitted from the output port 3223 to the input port 3221 without going through the data processing unit 3222 (see (vii)). The data transmitted to the input port 3221 is transmitted to the slave 321 through the cable 8. The data is input to the output port 3213 of the slave 321 (see (viii)).

When the data is input to the output port 3213 of the slave 321, the data is transmitted from the output port 3213 to the input port 3211 without going through the data processing unit 3212 (see (ix)). Thereafter, the data is transmitted from the input port 3211 of the slave 321 to equipment (not shown) connected to the slave 321 through the cable 8 (see (x)).

In the example of FIG. 5, a data input ("input from OUT to IN") from the output port 3213 to the input port 3221 and a data input ("input from IN to OUT") from the input port 3221 into the output port 3213 are performed between the slave 321 and the slave 322.

In the case of a line topology, even when wiring connection is correct as described above, input from OUT to IN and input from IN to OUT are performed. On the other hand, in the case of a ring topology, input from IN to OUT is not performed as long as a wiring path is correct.

Further, in a slave, a data processing unit is disposed in a path from an input port to an output port. In a slave, frame processing is not performed when going from an output port to an input port. In a slave, a data processing unit is not disposed in a path from an output port to an input port. It is assumed that slaves (except for a branch slave) to be described below have such frame processing.

Hereinafter, the significance and processing for invalidating a port will be described with reference to two specific examples of a network.

<D. First Network Example>

(d1. Case where there is No Incorrect Wiring)

Figure 6:
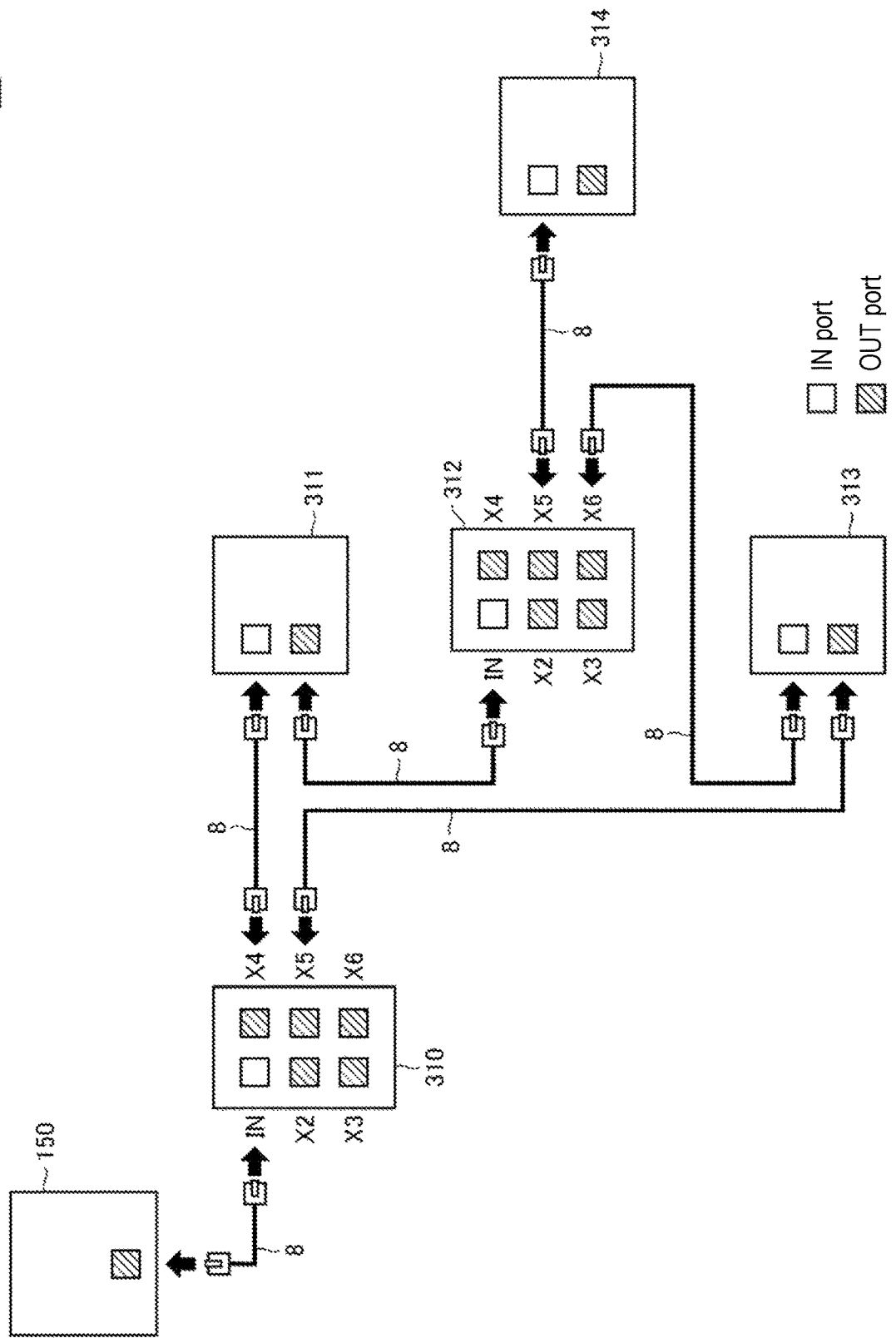
FIG. 6 is a diagram showing a configuration of a network.

FIG. 6 is a diagram showing a configuration of a network 50.

Referring to FIG. 6, the network 50 includes the master 150, slaves 310 to 314, and a support device 200 (not shown). The state of FIG. 6 shows a state where there is no incorrect wiring path.

The master 150 is connected to the slave 310 by the cable 8. In detail, an output port of the master 150 and an input port of the slave 310 are connected to each other by the cable 8.

The slave 310 is a branch slave. In the network 50, the slave 310 serves as a starting point and a terminal point of a ring topology. The slaves 311, 312, and 313 are connected between an output port X4 and an output port X5 of the slave 310 in this order from the starting point side of a ring topology. That is, the output port X4 of the slave 310 serves as a starting point port of a ring topology, and the output port X5 of the slave 310 serves as a terminal point port of a ring topology.

The slave 312 is a branch slave. An output port X5 of the slave 312 is connected to an input port of the slave 314 by the cable 8. An output port X6 of the slave 312 is connected to an input port of the slave 313 by the cable 8.

An output port of the slave 313 is connected to an output port X6 of the slave 310 by the cable 8.

Meanwhile, in the network 50 of the present example, only one slave (the slave 310 in the present example) serving as a starting point and a terminal point of a ring topology can be disposed within the network 50. Hereinafter, such a slave 310 is also referred to as a "ring starting point slave".

Figure 7:
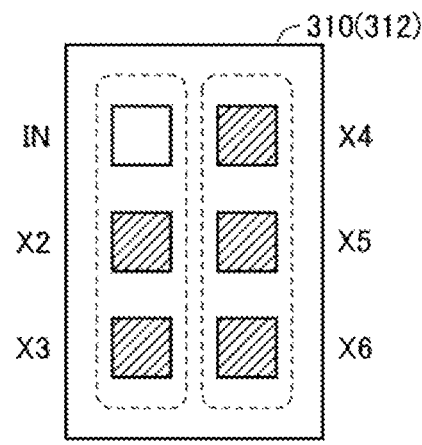
FIG. 7 is a diagram showing a branch slave.

FIG. 7 is a diagram showing branch slaves 310 and 312.

Referring to FIG. 7, in the slave 310, the output port X2 or the output port X4 serves as a port serving as a starting point (start point) of a ring topology (hereinafter, referred to as a "starting point port"). In a case where the output port X2 is used as a starting point port, the output port X3 serves as a port serving as a terminal point of a ring topology (hereinafter, referred to as a "terminal point port"). In a case where the output port X4 is used as a starting point port, the output port X5 serves as a terminal point port of a ring topology. Meanwhile, in the master 150, one physical slave 310 is treated as two logical slaves.

Figure 8:
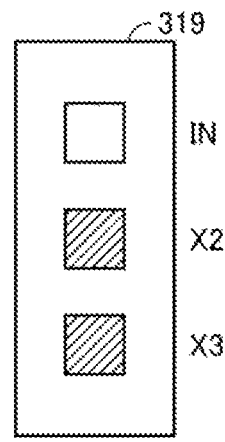
FIG. 8 is a diagram showing another branch slave.

FIG. 8 is a diagram showing another branch slave 319.

Referring to FIG. 8, in the slave 319, an output port X2 serves as a starting point port, and an output port X3 serves as a terminal point port. The slave 319 may be used instead of the slave 310 (or the slave 312).

Figure 9:
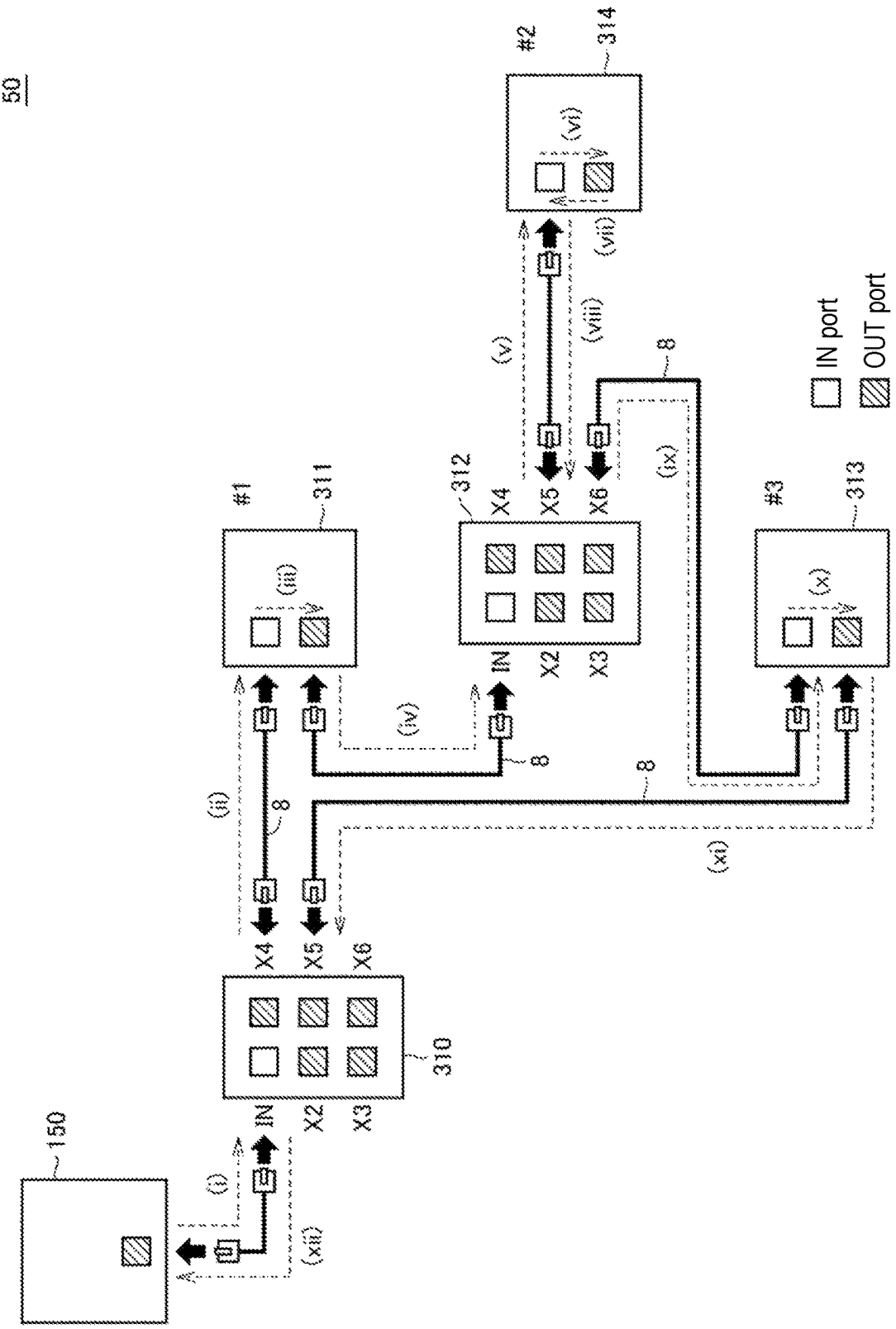
FIG. 9 is a diagram showing a flow of data in the network shown in FIG. 6.

FIG. 9 is a diagram showing a flow of data in the network 50 shown in FIG. 6. Hereinafter, a flow of data in a state where there is no incorrect wiring path will be described with reference to FIG. 9. Meanwhile, communication between a master and a slave and communication between slaves are performed through the cable 8.

First, data which is output from the output port of the master 150 is input to the input port of the slave 310 which is a ring starting point slave (see (i)). The input data is transmitted from the output port X4 (starting point port) of the slave 310 to an input port of the slave 311 (see (ii)). In the slave 311, the data which is input to the input port is transmitted to an output port through a data processing unit (not shown) (see (iii)).

The data which is output from the output port of the slave 311 is input to an input port of the branch slave 312 (see (iv)). The data which is input to the input port of the slave 312 is output from the output port X5 and is input to the input port of the slave 314 (see (v)).

In the slave 314, the data which is input to the input port is transmitted to an output port through a data processing unit (not shown) (see (vi)). Thereafter, in the slave 314, the data is transmitted from the output port to the input port without going through a data processing unit (not shown) (see (vii)). Thereafter, the data transmitted to the input port is input to the output port X5 of the branch slave 312 (see (viii)).

The data which is input to the output port X5 of the slave 312 is transmitted from the output port X6 of the slave 312 to an input port of the slave 313 (see (ix)). In the slave 313, the data which is input to the input port is transmitted to an output port through a data processing unit (not shown) (see (x)). The data which is output from the output port of the slave 313 is input to the output port X5 of the branch slave 310 (see (xi)). Thereafter, the data which is input to the output port X5 of the slave 310 is transmitted from the input port of the slave 310 to the output port of the master 150 (see (xii)).

In this manner, in the network 50, the data which is output from the master flows to the slave 310, the slave 311, the slave 312, the slave 314, the slave 313, the slave 310, and the master 150 in this order. Focusing on the slaves other than the branch slaves 310 and 312, the data which is output from the master flows to the slave 311, the slave 314, and the slave 313 in this order. In addition, processing is also performed by the data processing unit in the slave in the order of the slave 311 (#1 in the drawing), the slave 314 (#2 in the drawing), and the slave 313 (#3 in the drawing).

(d2. Case where there is Incorrect Wiring)

Figure 10:
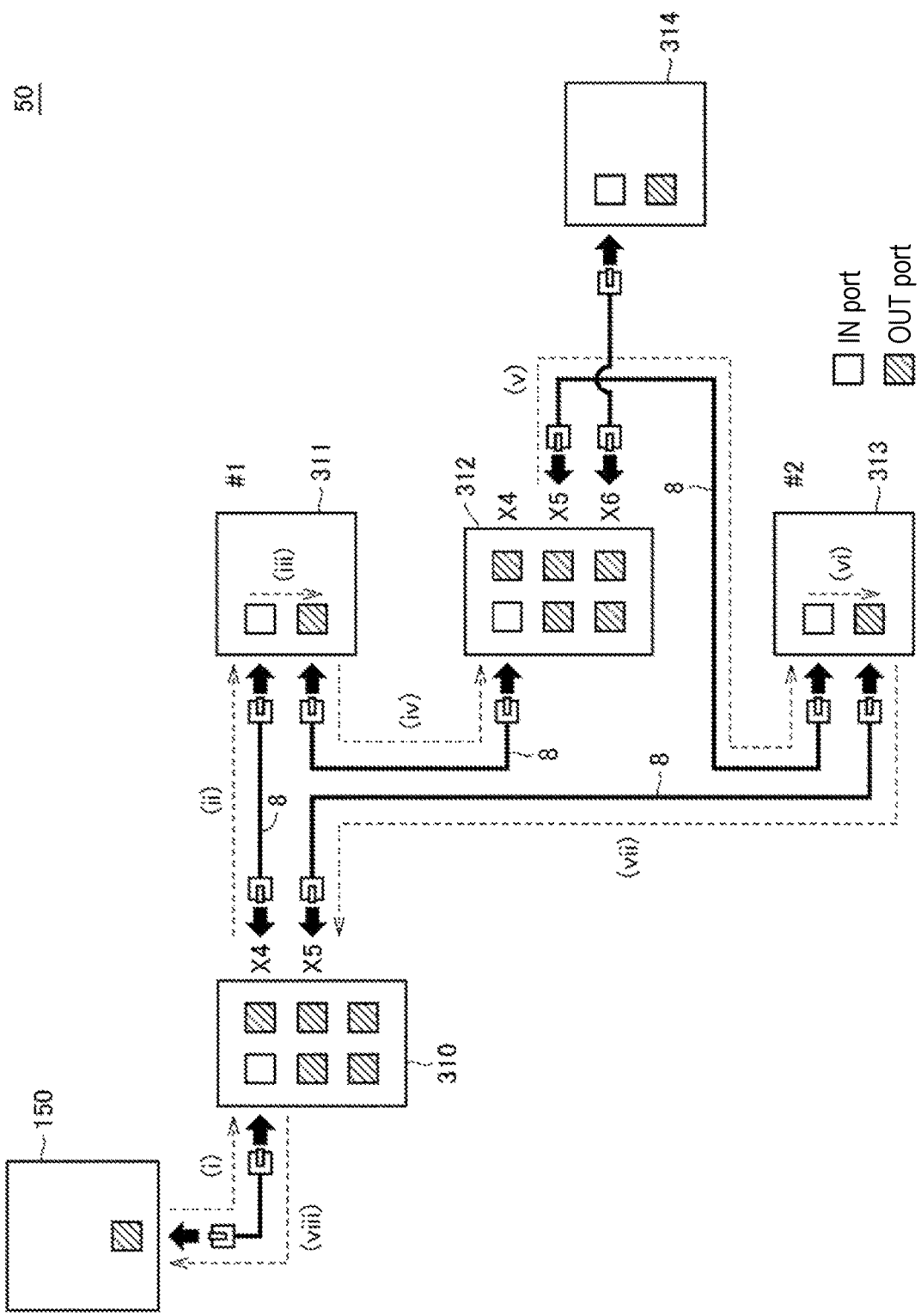
FIG. 10 is a diagram showing a flow of data in a case where an incorrect wiring path is formed in a network.

FIG. 10 is a diagram showing a flow of data in a case where an incorrect wiring path is formed in the network 50.

Referring to FIG. 10, connection of the slave 314 and the slave 313 to the branch slave 312 is incorrect. That is, the slave 314 to be connected to the output port X5 of the slave 312 is erroneously connected to the output port X6. In addition, the slave 313 to be connected to the output port X6 of the slave 312 is erroneously connected to the output port X5. In this manner, the wiring of the slave 314 and the wiring of the slave 313 are erroneously put into the slave 312.

Hereinafter, a flow of data in the case of FIG. 10 will be described. Meanwhile, description of paths (i) to (iv) is similar to that in the case of FIG. 9, and thus repeated description will be omitted here.

Data which is input to the input port of the slave 312 is output from the output port X5 of the slave 312 and is input to the input port of the slave 313 (see (v)). In the slave 313, the data which is input to the input port is transmitted to the output port through a data processing unit (not shown) (see (vi)). The data which is output from the output port of the slave 313 is input to the output port X5 of the branch slave 310 (see (vii)). Thereafter, the data which is input to the output port X5 of the slave 310 is transmitted from the input port of the slave 310 to the output port of the master 150 (see (viii)).

In this manner, in the network 50, in a case where there is an incorrect wiring path as described above, the data which is output from the master flows to the slave 310, the slave 311, the slave 312, the slave 313, the slave 310, and the master 150 in this order.

Focusing on the slaves other than the branch slaves 310 and 312, the data which is output from the master flows to the slave 311 and the slave 313 in this order. In addition, processing is also performed by the data processing unit in the slave in the order of the slave 311 (#1 in the drawing) and the slave 313 (#2 in the drawing). That is, the data does not flow to the slave 314. For this reason, the master 150 cannot detect the presence of the slave 314.

(d3. Method of Detecting Slave 314)

Incidentally, as a method of detecting the presence of the slave 314, it is conceivable to remove the cable 8 from the output port X5 (that is, the terminal point port) of the branch slave 310 which is a ring starting point slave. Hereinafter, a flow of data in this case will be described.

Figure 11:
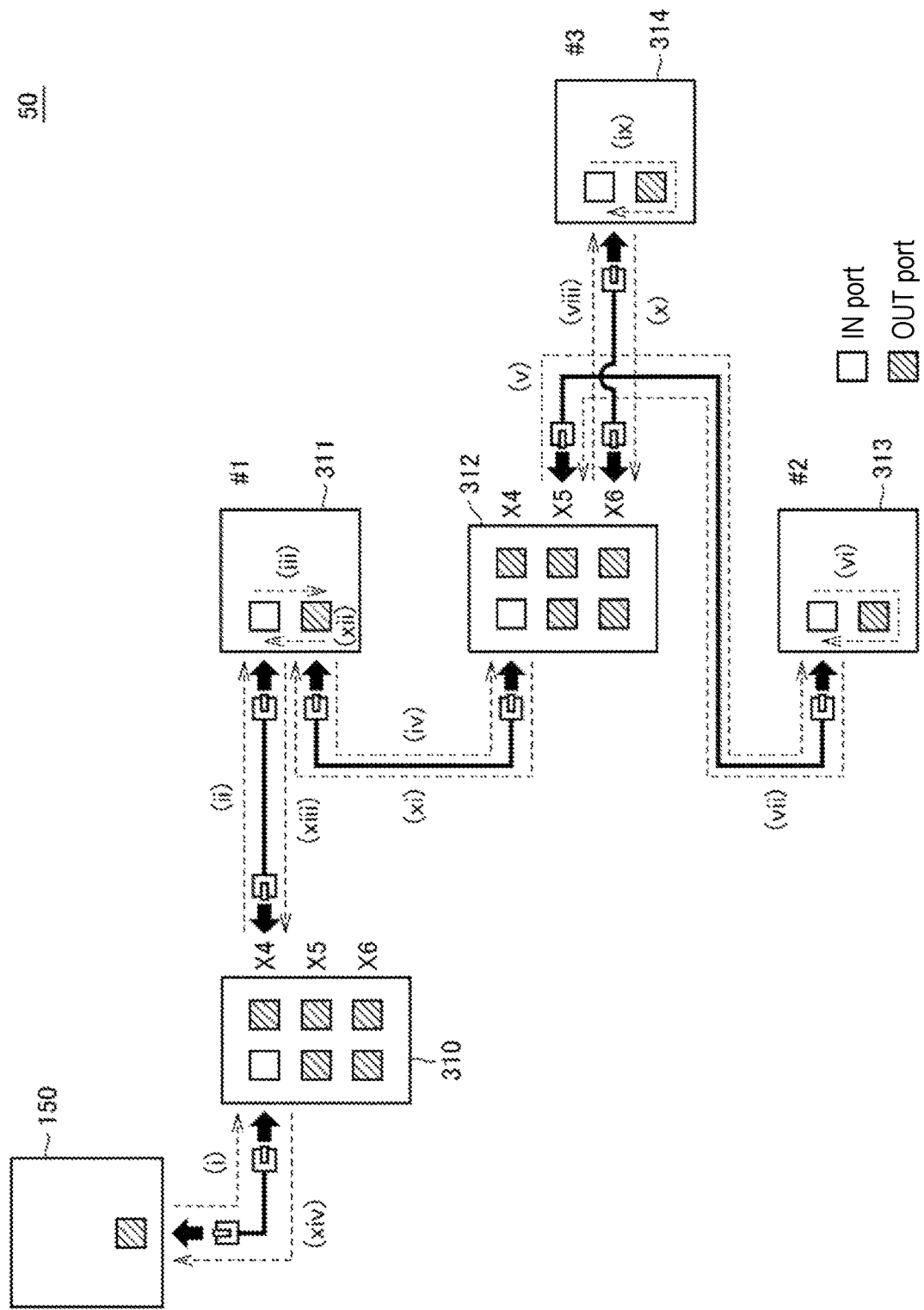
FIG. 11 is a diagram showing a state where a cable is removed from an output port of a slave.

FIG. 11 is a diagram showing a state where a cable is removed from the output port X5 of the slave 310. Meanwhile, in the example of FIG. 11, a cable that has been used for connection to the slave 310 is also removed from the output port of the slave 313. Meanwhile, description of paths (i) to (v) is similar to that in the case of FIG. 10, and thus repeated description will be omitted here.

Data which is input to the input port of the slave 313 is transmitted to the output port of the slave 313 through the data processing unit (not shown) in the slave 313 and is then transmitted from the output port to the input port of the slave 313 (see (vi)). Thereafter, the data is transmitted from the input port of the slave 313 to the output port X5 of the slave 312 (see (vii)). The data which is input to the output port X5 of the slave 312 is input from the output port X6 of the slave 312 to the input port of the slave 314 (see (viii)).

The data which is input to the input port of the slave 314 is transmitted to an output port of the slave 314 through the data processing unit (not shown) in the slave 314 and is then transmitted from the output port to the input port of the slave 314 (see (ix)). Thereafter, the data is transmitted from the input port of the slave 314 to the output port X6 of the slave 312 (see (x)).

Thereafter, the data which is input to the output port X6 of the slave 312 is input from the input port of the slave 312 to the output port of the slave 311 (see (xi)). The data which is input to the output port of the slave 311 is transmitted to the input port of the slave 311 (see (xii)) and is then input from the input port to the output port X4 of the slave 310 which is a ring starting point slave (see (xiii)).

The data which is input to the output port X4 of the slave 310 is transmitted from the input port of the slave 310 to the output port of the master 150 (see (xiv)).

In this manner, in the network 50 shown in FIG. 11, the data which is output from the master flows to the slave 310, the slave 311, the slave 312, the slave 313, the slave 312, the slave 314, the slave 312, the slave 311, the slave 310, and the master 150 in this order.

Focusing on the slaves other than the branch slaves 310 and 312, the data which is output from the master flows to the slave 311, the slave 313, the slave 314, and the slave 311 in this order. In addition, processing is also performed by the data processing unit in the slave in the order of the slave 311 (#1 in the drawing), the slave 313 (#2 in the drawing), and the slave 314 (#3 in the drawing).

In this manner, the cable 8 is removed from the output port X5 which is a terminal point port of the slave 310, and thus the master 150 can detect the presence of the slave 314.

However, as shown in FIG. 11, checking an incorrect wiring path by removing the cable is accompanied by on-site work such as removal of the cable, which takes time and effort. Consequently, hereinafter, a method for specifying an incorrect wiring path without removing a cable will be described.

As shown in FIG. 10, the master 150 applies data to a network by setting the output port X5 and the output port X6 of the slave 310 which is a ring starting point slave to be in a valid state. Meanwhile, details of the data will be described later. The master 150 receives the data by the path (viii) in FIG. 10 and then invalidates the output port X5 which is a terminal point port of the slave 310. That is, the master 150 closes the output port X5 of the slave 310.

Figure 12:
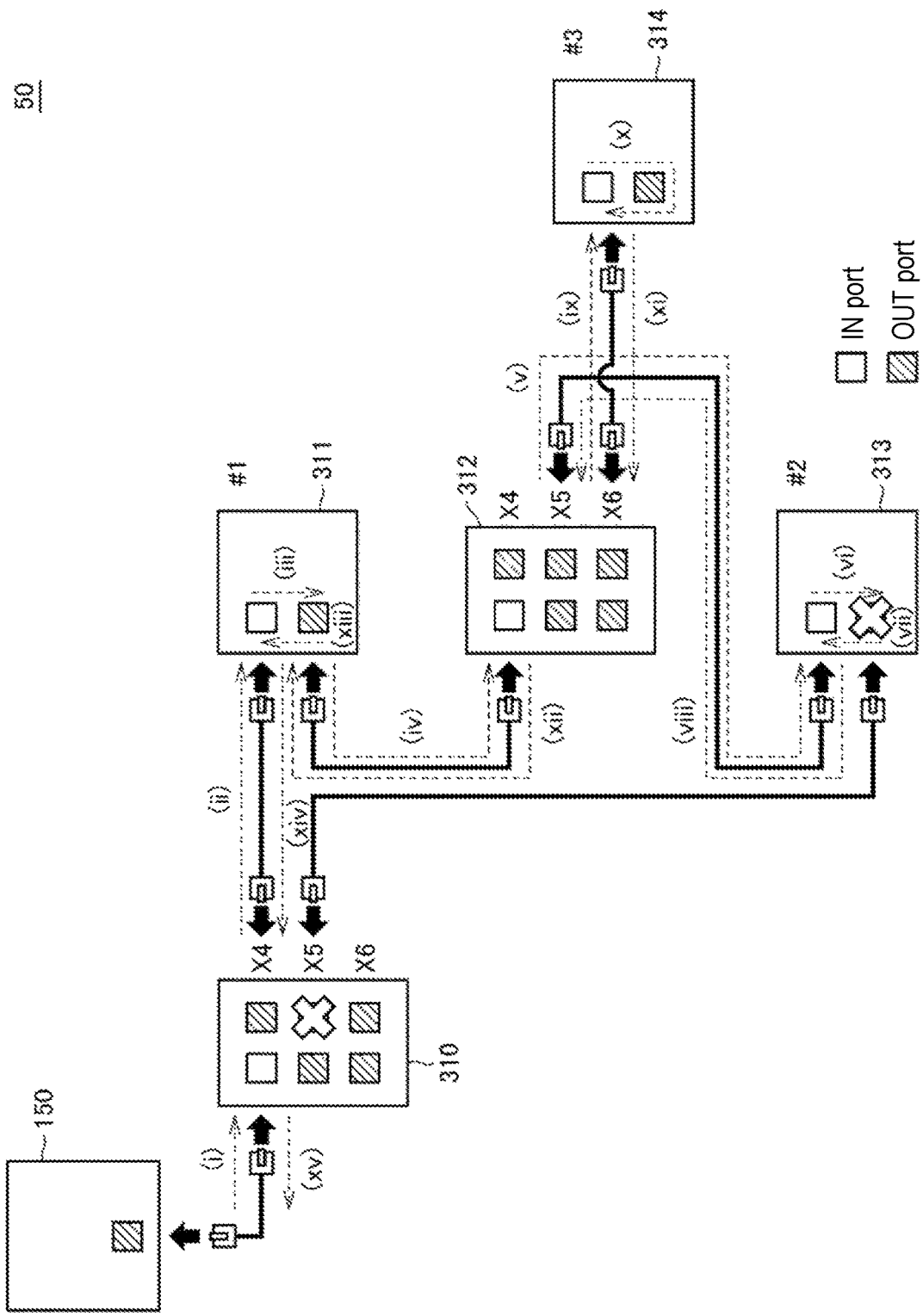
FIG. 12 is a diagram showing a state where an output port of a slave is invalidated.

FIG. 12 is a diagram showing a state where the output port X5 of the slave 310 and the output port of the slave 313 (that is, the output port of the slave 313 which is paired with the output port X5 of the slave 310) are invalidated. Hereinafter, a flow of data in the case of FIG. 12 will be described. Meanwhile, description of paths (i) to (v) is similar to that in the case of FIG. 10, and thus repeated description will be omitted here.

When data is input from the slave 312 to the input port of the slave 313, the output port of the slave 313 is invalidated, and thus the data is transmitted from the input port of the slave 313 to the output port X5 of the slave 312 without being output from the output port of the slave 313 (see (vi), (vii), and (viii)). The data which is input to the output port X5 of the slave 312 is input from the output port X6 of the slave 312 to the input port of the slave 314 (see (ix)).

The data which is input to the input port of the slave 314 is transmitted to the output port of the slave 314 through the data processing unit (not shown) in the slave 314 and is then transmitted from the output port to the input port of the slave 314 (see (x)). Thereafter, the data is transmitted from the input port of the slave 314 to the output port X6 of the slave 312 (see (xi)).

Thereafter, the data which is input to the output port X6 of the slave 312 is input from the input port of the slave 312 to the output port of the slave 311 (see (xii)). The data which is input to the output port of the slave 311 is transmitted to the input port of the slave 311 (see (xiii)) and is then input from the input port to the output port X4 of the slave 310 which is a ring starting point slave (see (xiv)).

The data which is input to the output port X4 of the slave 310 is transmitted from the input port of the slave 310 to the output port of the master 150 (see (xv)).

That is, after the data is transmitted from the input port of the slave 313 to the output port X5 of the slave 312 (after (xiii)), the data flows through a path similar to that in the case shown in FIG. 11 (the same as (vii) to (xiv) in FIG. 11).

In this manner, in the network 50 shown in FIG. 12, the data which is output from the master 150 flows to the slave 310, the slave 311, the slave 312, the slave 313, the slave 312, the slave 314, the slave 312, the slave 311, the slave 310, and the master 150 in this order.

Focusing on the slaves other than the branch slaves 310 and 312, the data which is output from the master 150 flows to the slave 311, the slave 313, the slave 314, and the slave 311 in this order. In addition, processing is also performed by the data processing unit in the slave in the order of the slave 311 (#1 in the drawing), the slave 313 (#2 in the drawing), and the slave 314 (#3 in the drawing).

In this manner, the master 150 can detect the presence of the slave 314 by invalidating the output port X5 which is a terminal point port of the slave 310 and the output port of the slave 313.

The master 150 applies data to the network 50 in the case shown in FIG. 10 (a case where both the output ports X4 and X5 of the slave 310 are validated) and the case shown in FIG. 12 (a case where the output port X4 of the slave 310 is validated, and the output port X5 of the slave 310 and the output port of the slave 313 are invalidated), and thus the master can detect that a wiring path of the slave 314 with respect to the slave 312 is incorrect. In addition, the master can also detect that a wiring path of the slave 313 with respect to the slave 312 is incorrect.

As described above, the master 150 specifies an incorrect wiring path between the output port X4 and the output port X5 of the slave 310 on the basis of a configuration of a network detected when the output port X5 of the slave 310 is valid and a configuration of a network detected when the output port X5 of the slave 310 and the output port of the slave 313 are invalidated.

Accordingly, the master 150 outputs information indicating the specified incorrect wiring path to the support device 200, and thus a user (an administrator, an operator, or the like) of a network can visually recognize an incorrect path in a network including a ring topology in the support device 200. Thereby, even when a network configuration obtained by the master 150 is a network configuration which is not intended by the user, the user does not need to check wirings one by one at the site.

(d4. UI of Support Device 200)

Figure 13:
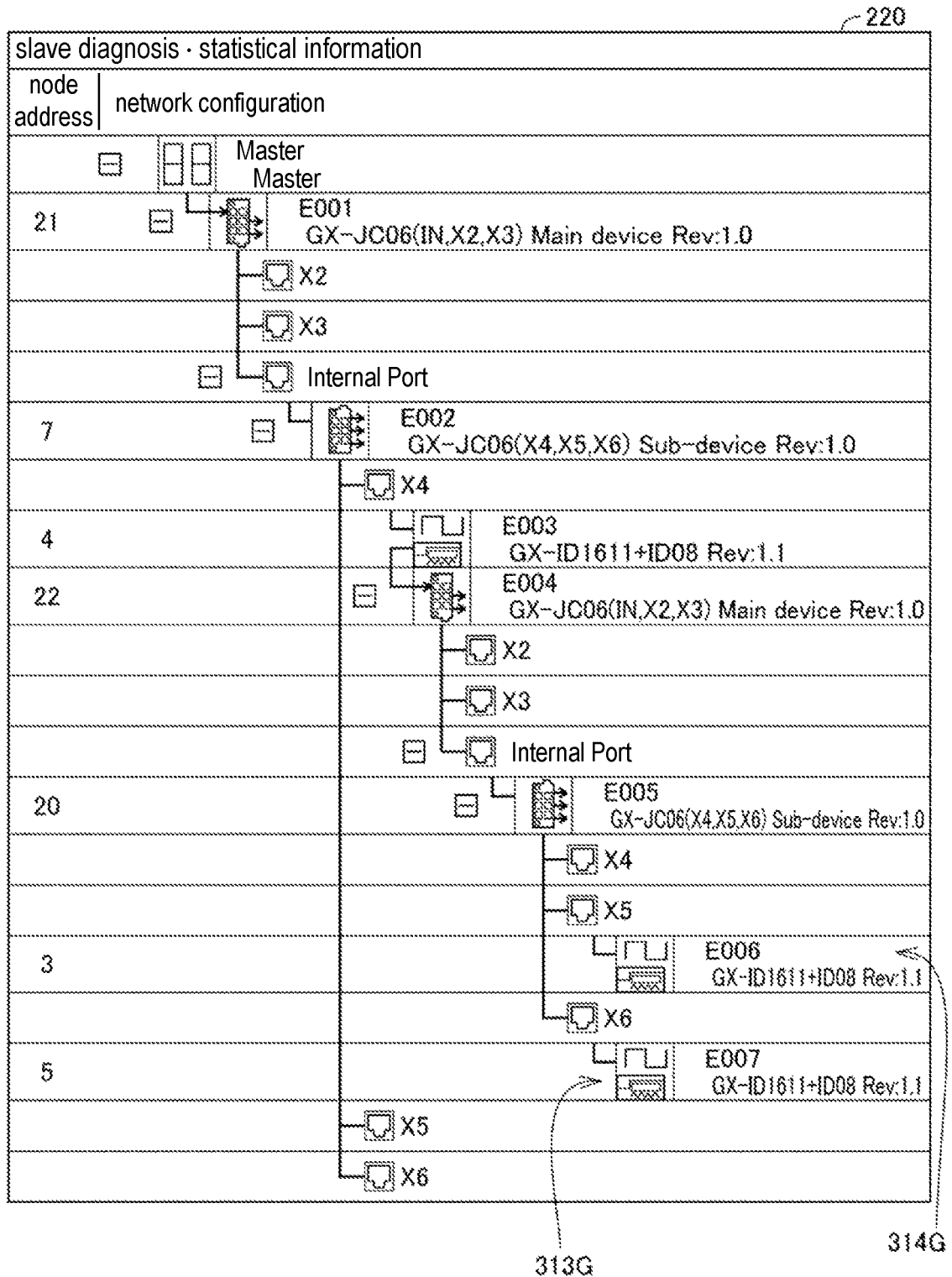
FIG. 13 is a diagram showing a screen displayed in a support device in a case where a network is configured in the state of FIG. 9.

FIG. 13 is a diagram showing a screen 220 displayed in the support device 200 in a case where the network 50 is configured in the state of FIG. 9. Meanwhile, the screen 220 is displayed in the support device 200 on the basis of an output from the master 150.

Referring to FIG. 13, an image 314G indicating the slave 314 is displayed on the screen 220 of the support device 200 in a manner of being connected to the output port X5 of the slave 312 (see FIG. 9). This is because the master 150 has detected the slave 314 due to an incorrect wiring path being not present in the state of the network 50 in FIG. 9. Meanwhile, an image 313G indicating the slave 313 is also displayed on the screen 220 in a manner of being connected to the output port X6 of the slave 312.

Figure 14:
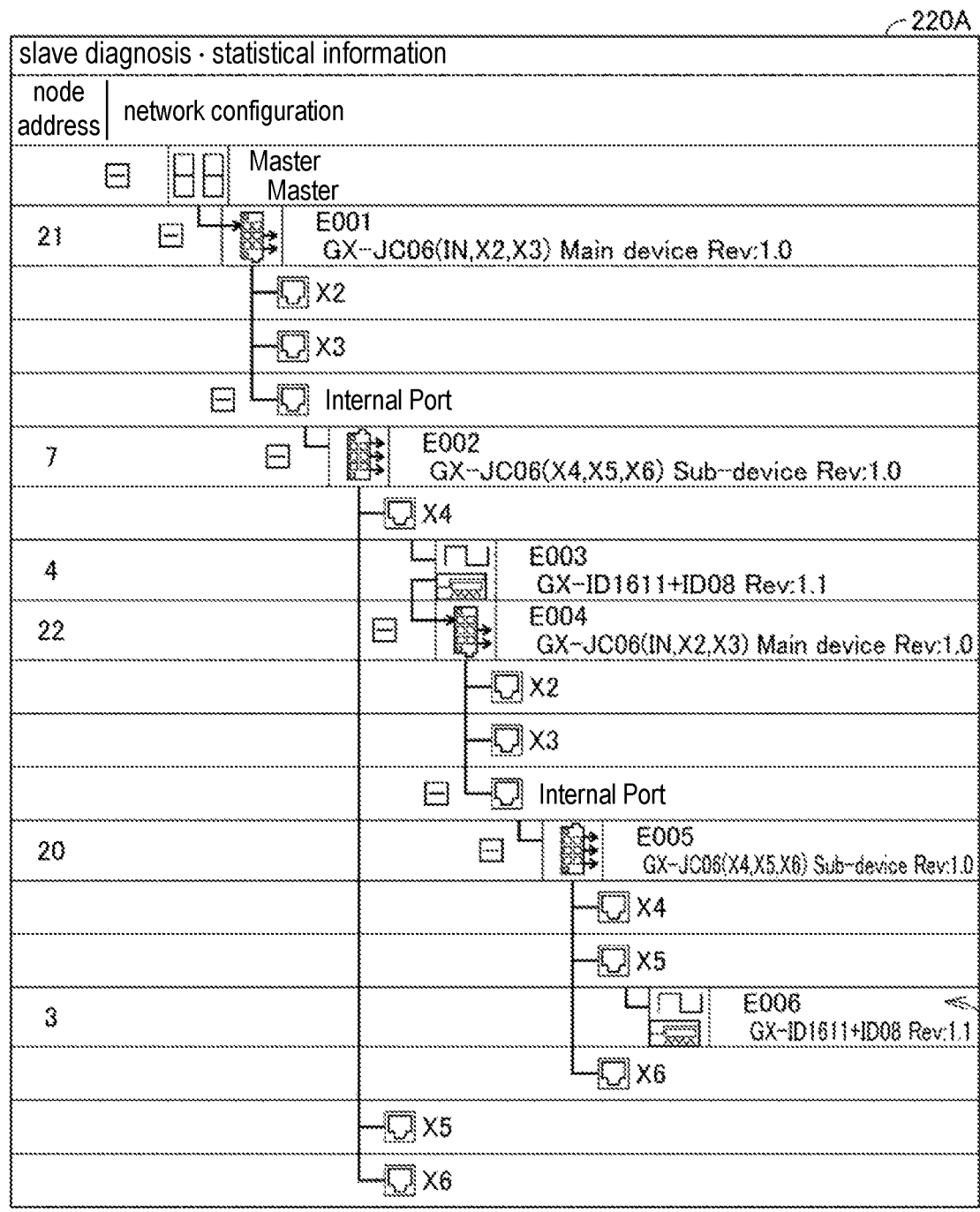
FIG. 14 is a diagram showing a screen displayed in a support device in a case where a network is configured in the state of FIG. 10.

FIG. 14 is a diagram showing a screen 220A displayed in the support device 200 in a case where the network 50 is configured in the state of FIG. 10. Meanwhile, the screen 220A is displayed in the support device 200 on the basis of an output from the master 150.

Referring to FIG. 14, an image 313G indicating the slave 313 is displayed on the screen 220A of the support device 200 in a manner of being connected to the output port X5 of the slave 312 (see FIG. 10). However, unlike FIG. 13, an image 314G indicating the slave 314 connected to the output port X6 of the slave 312 is not displayed on the screen 220A. This is because the master 150 cannot detect the slave 314 due to an incorrect wiring path being present in the state of the network 50 in FIG. 10.

Figure 15:
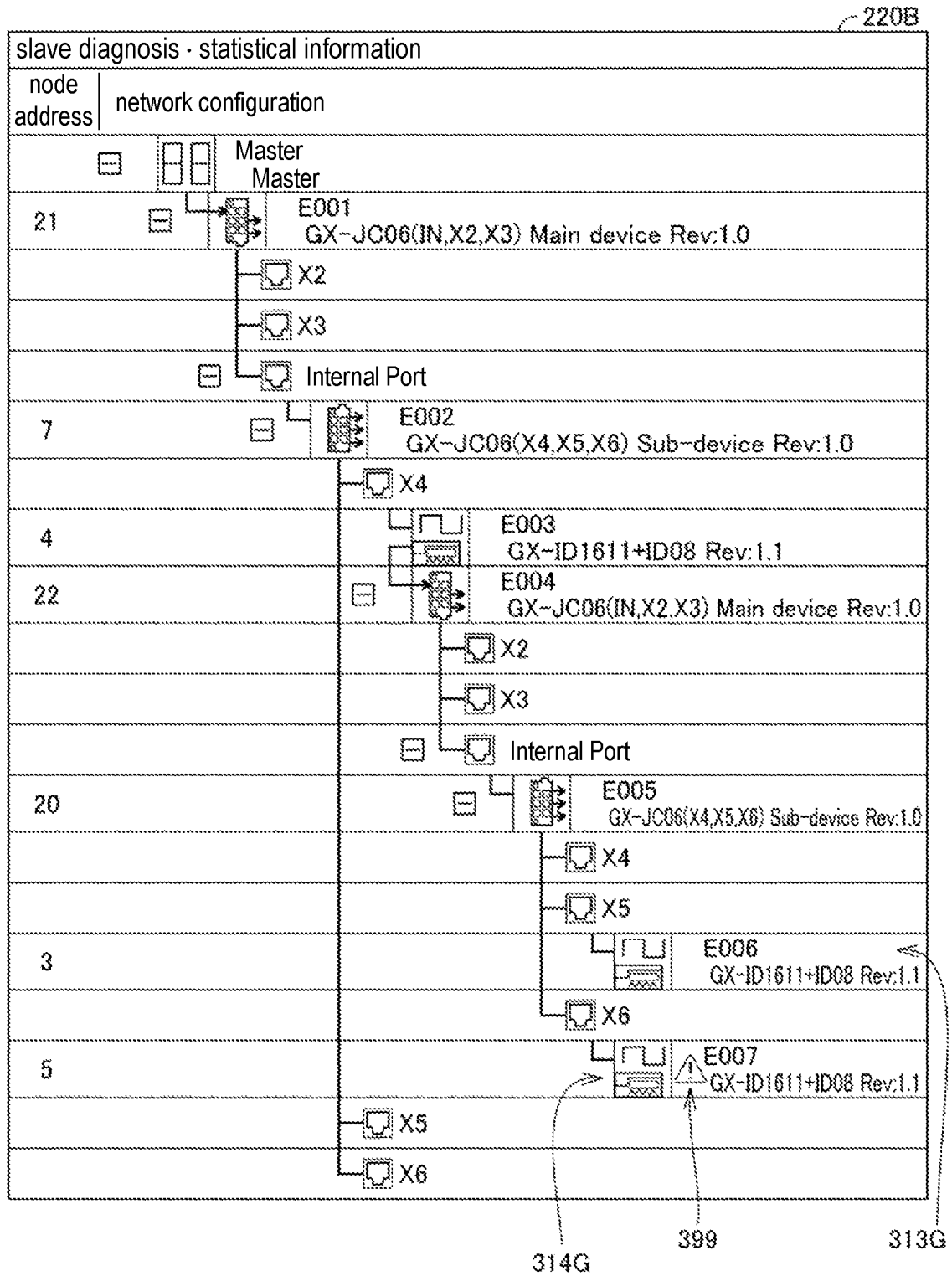
FIG. 15 is a diagram showing a screen displayed in a support device in a case where a network is configured in the state of FIG. 12.

FIG. 15 is a diagram showing a screen 220B displayed in the support device 200 in a case where the network 50 is configured in the state of FIG. 12. That is, the screen 220B is displayed when the output port X5 (terminal point port) of the slave 310 (see FIG. 12) and the output port of the slave 313 are invalidated. Meanwhile, the screen 220B is displayed in the support device 200 on the basis of an output from the master 150.

Referring to FIG. 15, an image 314G indicating the slave 314 is displayed on the screen 220B of the support device 200 in a manner of being connected to the output port X6 of the slave 312 (see FIG. 12). This is because the master 150 could detect the slave 314 due to the output port X5 of the slave 310 and the output port of the slave 313 being invalidated in the state of the network 50 in FIG. 12. Meanwhile, an image 313G indicating the slave 313 is also displayed on the screen 220 in a manner of being connected to the output port X5 of the slave 312.

Further, the image 314G includes an image 399 for warning display. The warning display is also performed in the support device 200 on the basis of an instruction given from the master 150.

As can be seen from comparison between the screen 220A in FIG. 14 and the screen 220B in FIG. 15, the master 150 invalidates the output port X5 of the slave 310 and the output port of the slave 313 to detect the slave 314 that could not be detected before the invalidation. For this reason, the master 150 notifies the support device 200 of a slave which is newly detected by the invalidation, and thus the support device 200 displays the image 314G indicating the slave in association with the image 399 for warning display. In detail, the master 150 detects a change in a configuration of a network based on a change in the state of the output port X5 of the slave 310 and the output port of the slave 313 (a change from a valid state to an invalid state), and thus the image 399 is displayed in the support device 200.

By such warning display, a user can determine that a wiring path for connecting the slave 314 to another slave is an incorrect wiring path. In addition, the user can determine that a wiring path of the slave 313 connected to the branch slave 312 is also incorrect together with the slave 314.

As described above, the master 150 invalidates (closes) a terminal point port of a ring starting point slave to detect a change in a configuration of a network and specify an incorrect wiring path in the network 50 from the detection result. The support device 200 displays an incorrect path. In this case, the support device 200 displays that a wiring path of a slave connected to the output port X6 of the slave 312 is incorrect using the image 399 for warning display.

(d5. Details of Method of Specifying Incorrect Wiring Path)

As described above, the master 150 invalidates an output port to specify an incorrect wiring path in the network 50. Hereinafter, details of the specification method will be described.

The master 150 detects a configuration of the network 50 using predetermined detection data in a state where the output port X5 of the slave 310 of the network 50 is valid.

In detail, detection data includes first data and second data for acquiring time stamp information indicating the time at which the first data passed through each slave from the slaves. First, the master 150 applies the first data to the network 50. The master 150 receives the first data that has returned through a ring topology and then applies the second data to the network 50. Then, the master 150 receives the second data that has returned through a ring topology.

Meanwhile, in detail, the time stamp information is the time at which data passed through each port. For example, in a case where data is input to an input port and is output from an output port, the time stamp information includes the time at which data passed through the input port and the time at which the data passed through the output port. A time stamp is stored in a data processing unit within each slave.

The master 150 can know the order in which data passes through ports by using the time stamp. In addition, the master 150 can determine which one of "input from OUT to IN", "input from IN to OUT", "input from OUT to OUT", and "input from IN to IN" is performed between two slaves connected to each other through a cable.

In addition, the master 150 can also determine the order of a flow of data from an input port to an output port through a data processing unit and a flow of data from an output port to an input port in a slave by using the time stamp.

By such a series of processes, the master 150 detects a configuration of the network 50 in a state where the output port X5 of the slave 310 is valid.

Incidentally, when there is no incorrect wiring path, a slave is generally in any one state of a "state where data flows from an input port to an output port, while data does not flow from the output port to the input port" and a "state where data flows from an input port to an output port, and data also flows from the output port to the input port".

In a slave, it can be said that an incorrect wiring path is generated in a "state where data does not flow from an input port to an output port, and data only flows from the output port to the input port". In this case, data does not pass through a data processing unit in the slave, and thus data processing in the data processing unit is not performed. For this reason, the master 150 cannot also detect the slave and acquire a time stamp of the slave.

Next, the master 150 detects a configuration of the network 50 using predetermined detection data as described above in a state where the output port X5 of the slave 310 and the output port of the slave 313 of the network 50 are invalidated. That is, the master 150 performs processing similar to that performed when the output port X5 is in a valid state. By such processing, the master 150 detects a configuration of the network 50 in a state where the output port X5 of the slave 310 is invalidated.

By the above-described processing, the master 150 can know a configuration of the network 50 in a state where the output port X5 of the slave 310 is in a valid state and a configuration of the network 50 in a state where the output port X5 of the slave 310 and the output port of the slave 313 are invalidated. Further, as also shown in FIG. 2, the master 150 has information of a network configuration (a user's intended network configuration) which is designed by the user.

As described above, the master 150 can detect a new slave by invalidating the output port X5 of the slave 310 and the output port of the slave 313. In addition, as described above, it is also possible to know the order of a slave when the output port X5 and the output port of the slave 313 are valid and a state when the output port X5 and the output port of the slave 313 are invalidated by a time stamp. The master 150 can specify an incorrect wiring path in the network 50 on the basis of these pieces of information and a network configuration designed by a user.

The master 150 typically transmits the detection data to a network when the master 150 is started up. Detection is performed at such a timing, and thus it is possible to know an incorrect wiring path before a user starts using the network.

In addition, the master 150 transmits the detection data to a network when the master 150 detects the addition of a slave to the network. In a case where a slave is added, there is a possibility that an incorrect wiring path will be generated due to an operator's erroneous operation. Consequently, the user can know an incorrect wiring path before starting using a network having a new configuration by performing detection at such a timing.

Meanwhile, also in a second network example to be described below, an incorrect wiring path is specified using detection data. In addition, hereinafter, description will be given focusing on differences from the first network example.

<E. Second Network Example>

A line topology will be described before a configuration of a second network is described. Thereafter, a network including a ring topology, which is a second network example, will be described.

(e1. Line Topology)

Figure 16:
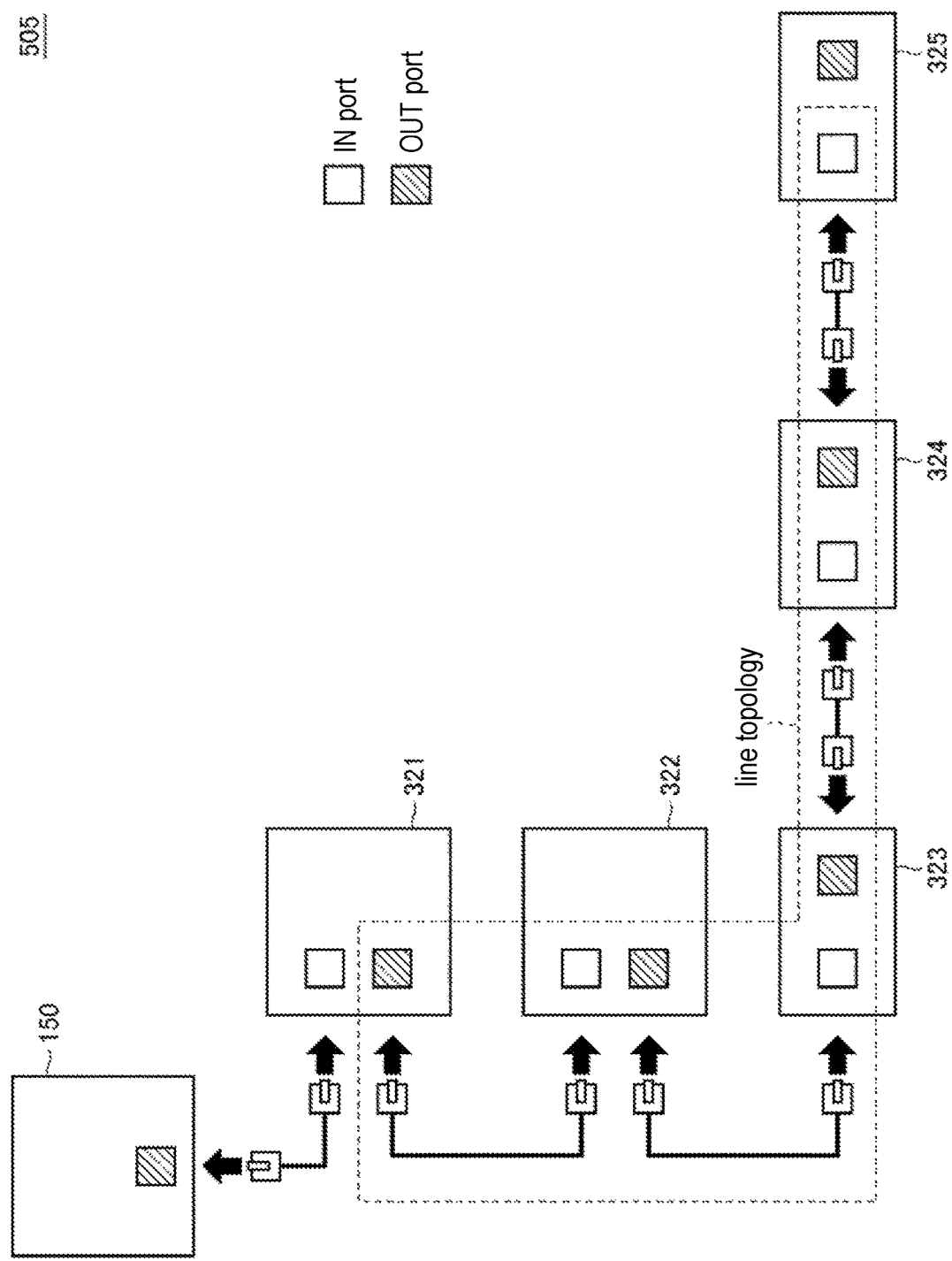
FIG. 16 is a diagram showing a network including a line topology.

FIG. 16 is a diagram showing a network 505 including a line topology.

Referring to FIG. 16, the network 505 includes a master 150 and a plurality of slaves 321 to 325. An input port of the slave 321 is connected to an output port of the master 150 through a cable. An output port of the slave 321 is connected to an input port of the slave 322 through a cable.

Similarly, an output port of the slave 322 is connected to an input port of the slave 323 through a cable. An output port of the slave 323 is connected to an input port of the slave 324 through a cable. An output port of the slave 324 is connected to an input port of the slave 325 through a cable. A cable is not connected to an output port of the slave 325.

The slaves 321 to 325 constitute a line topology. In detail, the line topology is constituted by the output port of the slave 321, the input ports and the output ports of the slaves 322 to 325, the input port of the slave 325, and the cables connecting the slaves.

Figure 17:
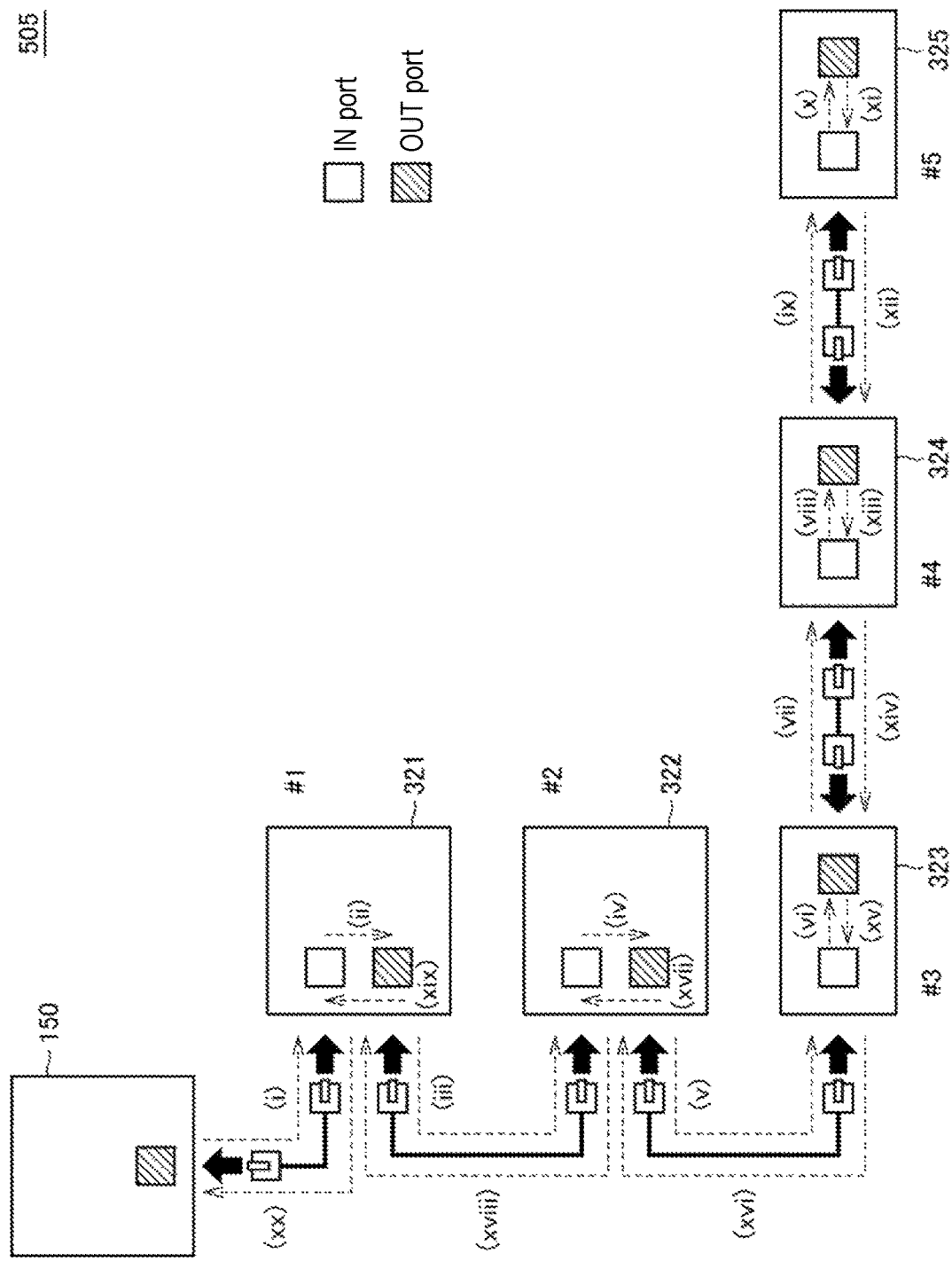
FIG. 17 is a diagram showing a flow of data in a network having the line topology shown in FIG. 16.

FIG. 17 is a diagram showing a flow of data in the network 505 having the line topology shown in FIG. 16.

Referring to FIG. 17, data which is output from the master 150 is input to the input port of the slave 321 (see (i)). In the slave 321, the data is transmitted from the input port to the output port through a data processing unit (not shown) (see (ii)). The data which is output from the output port of the slave 321 is input to the input port of the slave 322 (see (iii)).

In the slave 322, data is transmitted from the input port to the output port through a data processing unit (not shown) (see (iv)). The data which is output from the output port of the slave 322 is input to the input port of the slave 323 (see (v)).

In the slave 323, data is transmitted from the input port to the output port through a data processing unit (not shown) (see (vi)). The data which is output from the output port of the slave 323 is input to the input port of the slave 324 (see (vii)).

In the slave 324, data is transmitted from the input port to the output port through a data processing unit (not shown) (see (viii)). The data which is output from the output port of the slave 324 is input to the input port of the slave 325 (see (ix)).

In the slave 325 which is a terminus of the line topology, data is transmitted from the input port to the output port through a data processing unit (not shown) (see (x)). Thereafter, the data is transmitted from the output port to the input port without going through a data processing unit (see (xi)). That is, the data is turned back. The data which is output from the output port of the slave 325 is input to the output port of the slave 324 (see (xii)).

In the slave 324, data is transmitted from the output port to the input port without going through a data processing unit (see (xiii)). The data which is output from the input port of the slave 324 is input to the output port of the slave 323 (see (xiv)).

In the slave 323, data is transmitted from the output port to the input port without going through a data processing unit (see (xv)). The data which is output from the input port of the slave 323 is input to the output port of the slave 322 (see (xvi)).

In the slave 322, data is transmitted from the output port to the input port without going through a data processing unit (see (xvii)). The data which is output from the input port of the slave 322 is input to the output port of the slave 321 (see (xviii)).

In the slave 321, data is transmitted from the output port to the input port without going through a data processing unit (see (xix)). The data which is output from the input port of the slave 321 is input to the output port of the master 150 (see (xx)).

The data flows through the slaves constituting the line topology from the master 150 through the above-described paths (i) to (xx) and returns to the master 150. In detail, in the network 505 shown in FIG. 17, the data which is output from the master 150 flows to the slave 321, the slave 322, the slave 323, the slave 324, the slave 325, the slave 324, the slave 323, the slave 322, the slave 321, and the master 150 in this order.

In addition, processing is performed by the data processing units in the slaves 321 to 325 in the order of the slave 321 (#1 in the drawing), the slave 322 (#2 in the drawing), the slave 323 (#3 in the drawing), the slave 324 (#4 in the drawing), and the slave 325 (#5 in the drawing).

Figure 18:
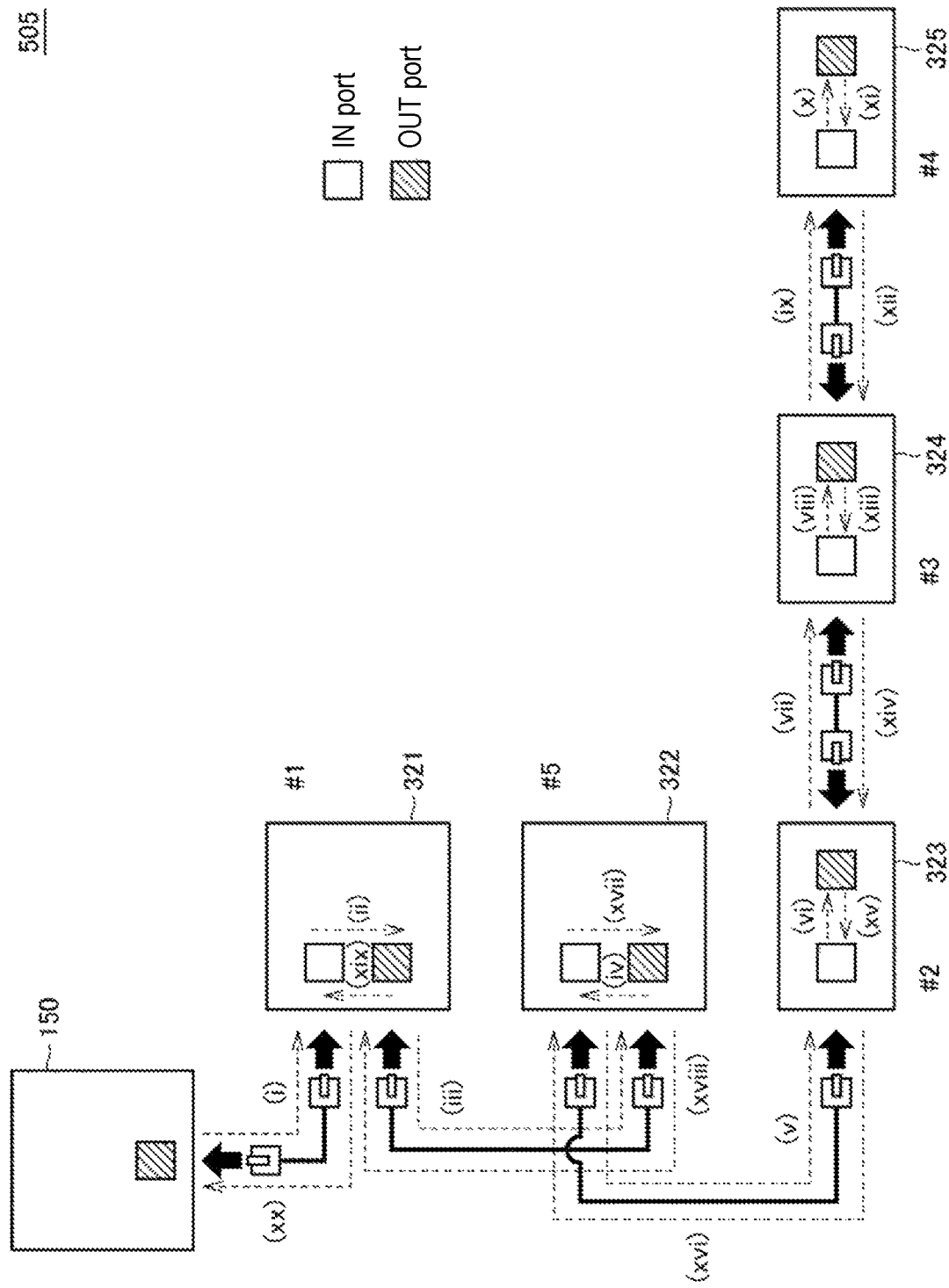
FIG. 18 is a diagram showing a flow of data in a case where an incorrect wiring path is formed in a network.

FIG. 18 is a diagram showing a flow of data in a case where an incorrect wiring path is formed in the network 505.

Referring to FIG. 18, in the present example, the incorrect wiring path includes a path connecting the output port of the slave 321 and the output port of the slave 322 and a path connecting the input port of the slave 322 and the input port of the slave 323. That is, in the present example, erroneous wiring for the input port and the output port of the slave 322 occurs.

Meanwhile, hereinafter, at least the paths (vi) to (xv) are the same as the paths (vi) to (xv) shown in FIG. 17, and thus repeated description of the paths (vi) to (xv) will be omitted.

Data which is output from the master 150 is input to the input port of the slave 321 (see (i)). In the slave 321, the data is transmitted from the input port to the output port through a data processing unit (not shown) (see (ii)). The data which is output from the output port of the slave 321 is input to the output port of the slave 322 (see (iii)).

In the slave 322, the data is transmitted from the output port to the input port through a data processing unit (not shown) (see (iv)). The data which is output from the input port of the slave 322 is input to the input port of the slave 323 (see (v)).

The data which is output from the input port of the slave 323 is input to the input port of the slave 322 (see (xvi)).

In the slave 322, the data is transmitted from the input port to the output port through a data processing unit (see (xvii)). The data which is output from the output port of the slave 322 is input to the output port of the slave 321 (see (xviii)).

In the slave 321, the data is transmitted from the output port to the input port without going through a data processing unit (see (xix)). The data which is output from the input port of the slave 321 is input to the output port of the master 150 (see (xx)).

The data flows through the slaves constituting the line topology from the master 150 through the above-described paths (i) to (xx) and returns to the master 150. In detail, in the network 505 shown in FIG. 18, the data which is output from the master 150 flows to the slave 321, the slave 322, the slave 323, the slave 324, the slave 325, the slave 324, the slave 323, the slave 322, the slave 321, and the master 150 in this order, similar to FIG. 17.

However, processing is performed by the data processing units in the slaves 321 to 325 in the order of the slave 321 (#1 in the drawing), the slave 323 (#2 in the drawing), the slave 324 (#3 in the drawing), the slave 325 (#4 in the drawing), and the slave 322 (#5 in the drawing), unlike the case of FIG. 17.

In this manner, in the case of a line topology, even when there is an incorrect wiring as shown in FIG. 18, the master 150 can detect the slave 322. In addition, the master 150 can determine the order in which first data passes through the data processing units of the slaves 321 to 325 on the basis of a time stamp by using the above-described detection data. Thus, the master 150 can specify an incorrect wiring path in the network 505 of FIG. 18. For this reason, a user can know the incorrect wiring path through a display performed by the support device 200.

On the premise of the above description, a network 52 including a ring topology will be described.

(e2. Network 52)

Figure 19:
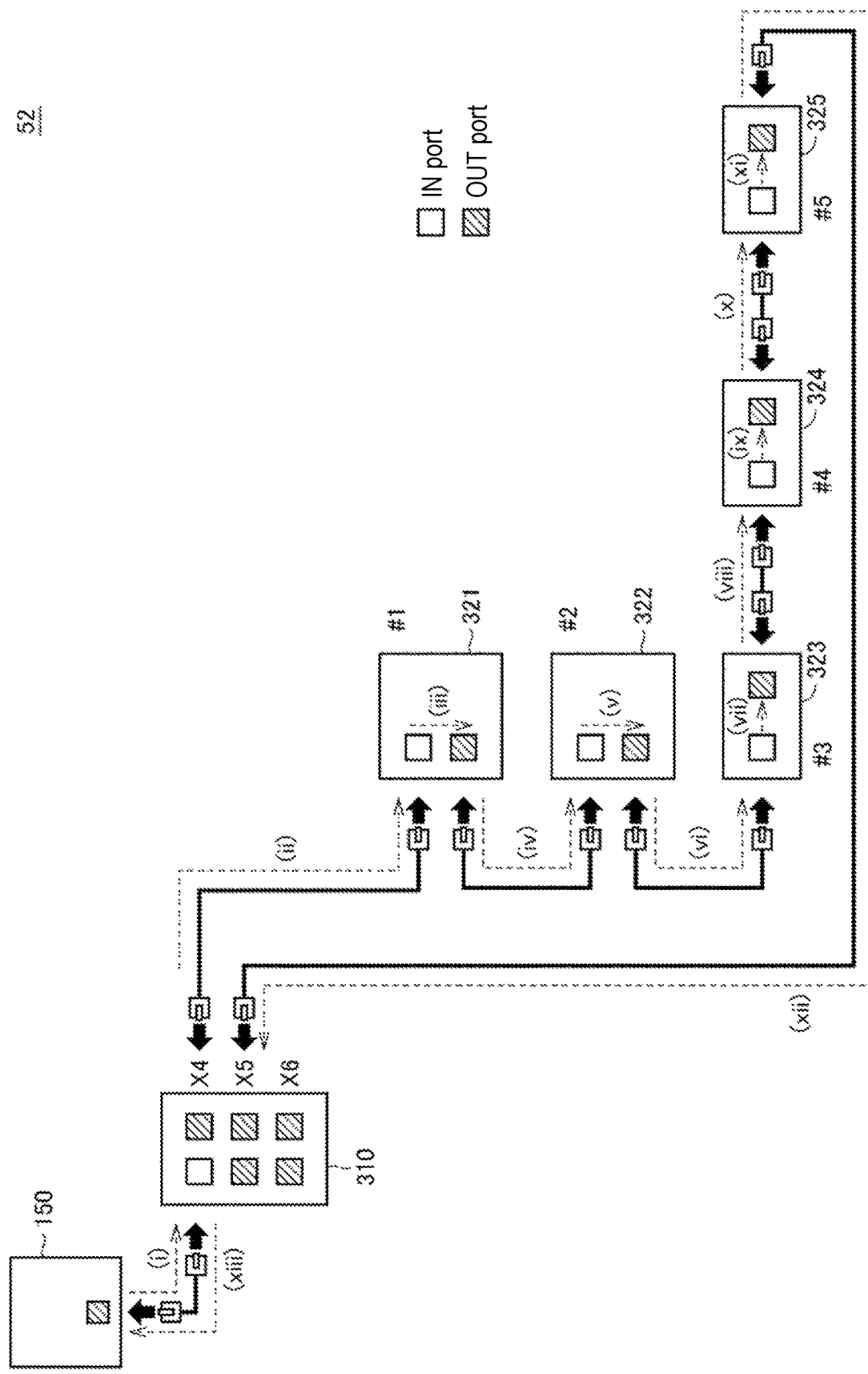
FIG. 19 is a diagram showing a flow of data in a network.

FIG. 19 is a diagram showing a flow of data in the network 52. Meanwhile, in a state shown in FIG. 19, the network 52 does not include an incorrect wiring path.

Referring to FIG. 19, the network 52 includes a master 150, a branch slave 310 which is a ring starting point slave, a plurality of slaves 321 to 325, and a support device 200 (not shown).

An output port of the master 150 is connected to an branch input port of the branch slave 310 through a cable. An output port X4 (starting point port) of the slave 310 is connected to an input port of the slave 321 through a cable.

An output port of the slave 321 is connected to an input port of the slave 322 through a cable. Similarly, an output port of the slave 322 is connected to an input port of the slave 323 through a cable. An output port of the slave 323 is connected to an input port of the slave 324 through a cable. An output port of the slave 324 is connected to an input port of the slave 325 through a cable.

An output port of the slave 325 is connected to an output port X5 (terminal point port) of the branch slave 310 through a cable.

As described above, when only portions of the plurality of slaves 321 to 325 are viewed by ignoring the presence of the branch slave 310, a mode of a line topology is obtained as shown in FIG. 16.

Next, a flow of data will be described.

Data which is output from the output port of the master 150 is input to the input port of the slave 310 which is a ring starting point slave (see (i)). The input data is transmitted from the output port X4 (starting point port) of the slave 310 to the input port of the slave 321 (see (ii)). In the slave 321, the data which is input to the input port is transmitted to the output port through a data processing unit (not shown) (see (iii)).

The data which is output from the output port of the slave 321 is input to the input port of the slave 322 (see (iv)). In the slave 322, the data which is input to the input port is transmitted to the output port through a data processing unit (not shown) (see (v)).

The data which is output from the output port of the slave 322 is input to the input port of the slave 323 (see (vi)). In the slave 323, the data which is input to the input port is transmitted to the output port through a data processing unit (not shown) (see (vii)).

The data which is output from the output port of the slave 323 is input to the input port of the slave 324 (see (viii)). In the slave 324, the data which is input to the input port is transmitted to the output port through a data processing unit (not shown) (see (ix)).

The data which is output from the output port of the slave 324 is input to the input port of the slave 325 (see (x)). In the slave 325, the data which is input to the input port is transmitted to the output port through a data processing unit (not shown) (see (xi)).

The data which is output from the output port of the slave 325 is input to the output port X5 (terminal point port) of the branch slave 310 (see (xii)). In the slave 310, the data which is input to the output port X5 is transmitted from the input port to the master 150 (see (xiii)).

The data flows through the slaves constituting the ring topology from the master 150 through the above-described paths (i) to (xiii) and returns to the master 150. In detail, in the network 52 shown in FIG. 19, the data which is output from the master 150 flows to the slave 310, the slave 321, the slave 322, the slave 323, the slave 324, the slave 325, the slave 310, and the master 150 in this order.

In addition, processing is performed by the data processing units in the slaves 321 to 325 in the order of the slave 321 (#1 in the drawing), the slave 322 (#2 in the drawing), the slave 323 (#3 in the drawing), the slave 324 (#4 in the drawing), and the slave 325 (#5 in the drawing).

Figure 20:
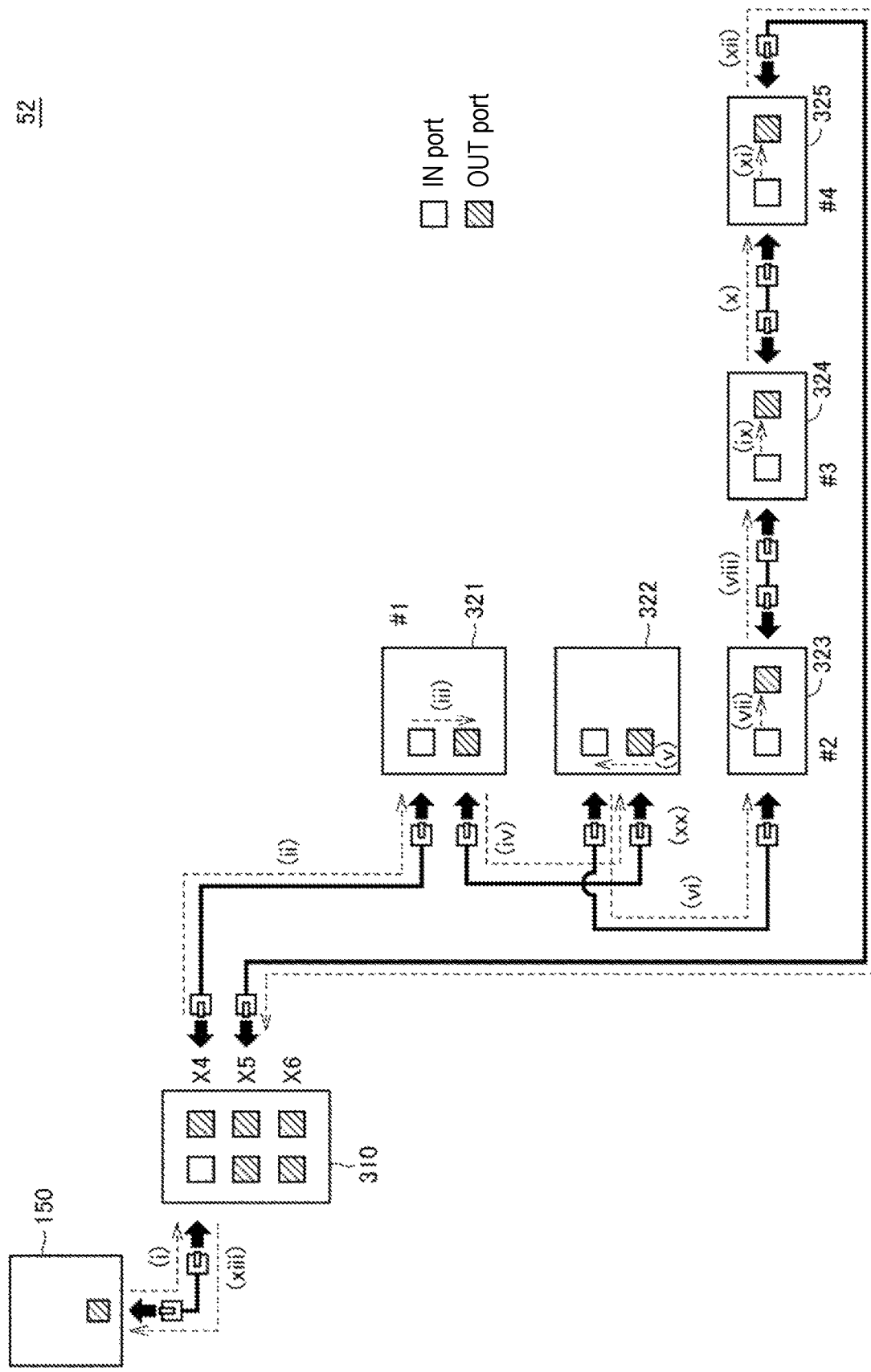
FIG. 20 is a diagram showing a flow of data in a case where an incorrect wiring path is formed in a network.

FIG. 20 is a diagram showing a flow of data in a case where an incorrect wiring path is formed in the network 52.

Referring to FIG. 20, in the present example, the incorrect wiring path includes a path connecting the output port of the slave 321 and the output port of the slave 322 and a path connecting the input port of the slave 322 and the input port of the slave 323, similar to FIG. 18. That is, also in the present example, similar to FIG. 18, erroneous wiring for the input port and the output port of the slave 322 occurs.

Meanwhile, hereinafter, paths (i) to (iii) and (vii) to (xiii) are the same as the paths (i) to (iii) and (vii) to (xiii) shown in FIG. 19, and thus repeated description of the paths (i) to (iii) and (vii) to (xiii) will be omitted.

Data which is output from the output port of the slave 321 is input to an output port of the slave 322 (see (iv)). In the slave 322, the data is transmitted from the output port to an input port without going through a data processing unit (not shown) (see (v)). The data which is output from the input port of the slave 322 is input to the input port of the slave 323 (see (vi)).

In this manner, the data is not input to the data processing unit (not shown) of the slave 322. Thus, the master 150 cannot detect the slave 322 even using the above-described detection data. Consequently, in the present example, as will be described below, the output port X5 of the slave 310 which is a ring starting point slave and the output port of the slave 325 are invalidated.

Figure 21:
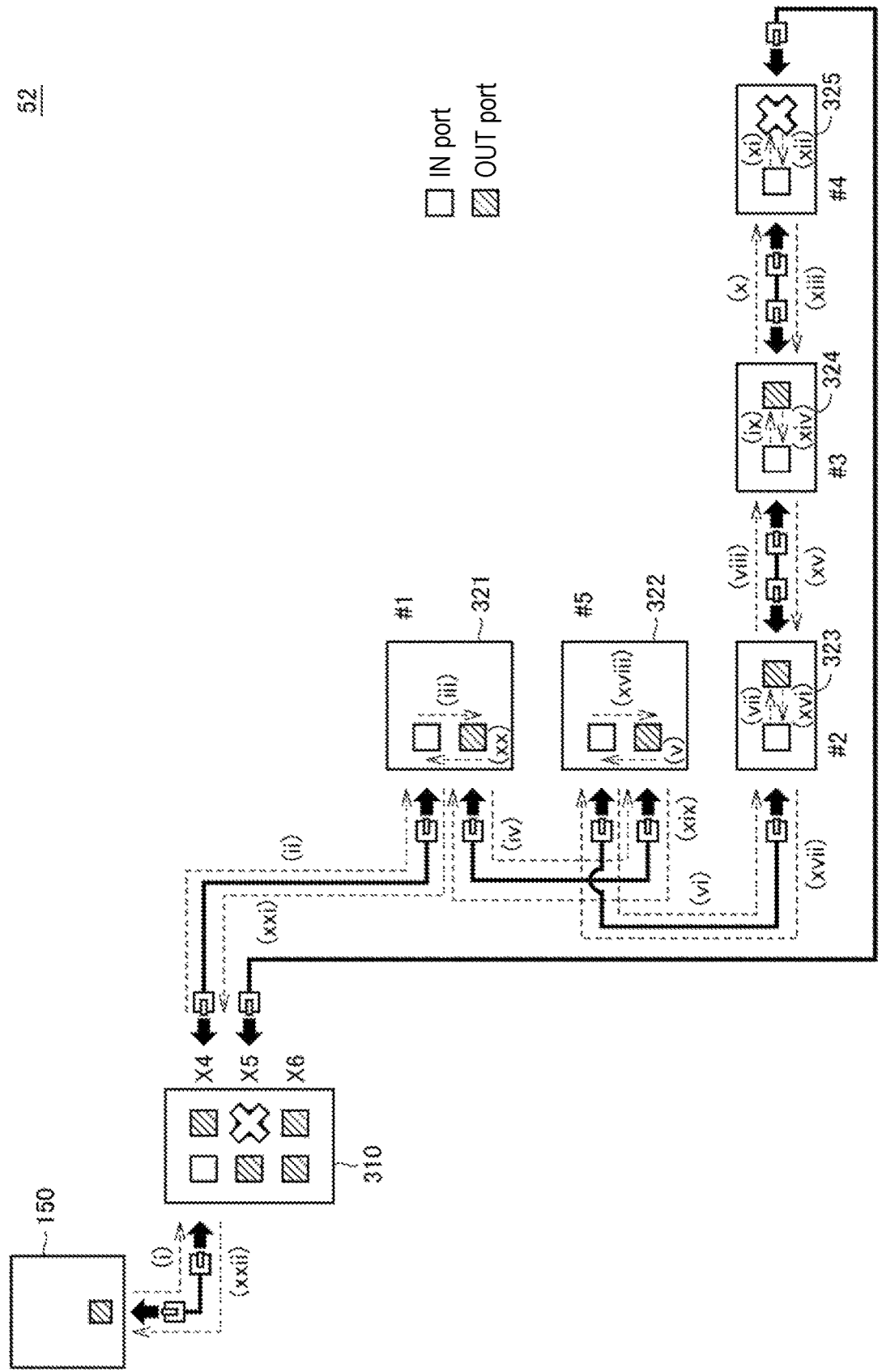
FIG. 21 is a diagram showing a state where an output port of a slave is invalidated.

FIG. 21 is a diagram showing a state where the output port X5 of the slave 310 and the output port of the slave 325 are invalidated. Hereinafter, a flow of data in the case of FIG. 21 will be described. Meanwhile, description of paths (i) to (xi) is similar to that in the case of FIG. 20, and thus repeated description will be omitted here.

Referring to FIG. 21, the output port X5 of the slave 310 and the output port of the slave 325 (that is, the output port of the slave 325 which is paired with the output port X5 of the slave 310) are invalidated, and thus data is transmitted from the input port of the slave 325 to the output port of the slave 324 (see (xii) and (xiii)). In the slave 324, the data which is input to the output port of the slave 324 is transmitted to the input port of the slave 324 without going through a data processing unit (not shown) (see (xiv)). Further, the data is transmitted from the input port of the slave 324 to the output port of the slave 323 (see (xv)). In the slave 323, the data which is input to the output port of the slave 323 is transmitted to the input port of the slave 323 without going through a data processing unit (not shown) (see (xvi)).

In addition, the data is transmitted from the input port of the slave 323 to the input port of the slave 322 (see (xvii)). Then, in the slave 322, the data which is input to the input port of the slave 322 is transmitted to the output port of the slave 322 through a data processing unit (not shown) (see (xviii)).

The data is transmitted from the output port of the slave 322 to the output port of the slave 321 (see (xix)). Further, the data is transmitted from the output port of the slave 321 to the input port of the slave 321 in the slave 321 (see (xx)). In addition, the data is transmitted from the input port of the slave 321 to the output port X4 (starting point port) of the slave 310 (see (xxi)). In the slave 310, the data which is input to the output port X4 is transmitted from the input port to the master 150 (see (xxii)).

The data flows through the slaves constituting the ring topology from the master 150 through the above-described paths (i) to (xxii) and returns to the master 150. In detail, in the network 52 shown in FIG. 21, the data which is output from the master 150 flows to the slave 310, the slave 321, the slave 322, the slave 323, the slave 324, the slave 325, the slave 324, the slave 323, the slave 322, the slave 321, the slave 310, and the master 150 in this order.

In addition, processing is performed by the data processing units in the slaves 321 to 325 in the order of the slave 321 (#1 in the drawing), the slave 323 (#2 in the drawing), the slave 324 (#3 in the drawing), the slave 325 (#4 in the drawing), and the slave 322 (#5 in the drawing).

In this manner, the output port X5 which is a terminal point port of the slave 310 and the output port of the slave 325 are invalidated, and thus the master 150 can detect the presence of the slave 322.

The master 150 applies data (in detail, the above-described detection data) to the network 50 in the case shown in FIG. 20 (a case where both the output ports X4 and X5 of the slave 310, X5 are validated) and the case shown in FIG. 21 (a case where the output port X4 of the slave 310 is validated, and the output port X5 of the slave 310 and the output port of the slave 325 are invalidated), and thus the master can detect that a wiring path of the slave 321 with respect to the slave 322 and a wiring path of the slave 323 are incorrect.

As described above, the master 150 specifies an incorrect wiring path between the output port X4 and the output port X5 of the slave 310 on the basis of a configuration of a network detected when the output port X5 of the slave 310 is valid and a configuration of a network detected when the output port X5 of the slave 310 and the output port of the slave 325 are invalidated.

Accordingly, the master 150 outputs information indicating the specified incorrect wiring path to the support device 200, and thus a user (an administrator, an operator, or the like) of a network can visually recognize an incorrect path in a network including a ring topology in the support device 200. Thereby, even when a network configuration obtained by the master 150 is a network configuration which is not intended by the user, the user does not need to check wirings one by one at the site.

FIG. 22 is a diagram showing a screen 230 displayed in the support device 200 in a case where detection data is applied to the network 52 in the state of FIG. 20, and data is applied to the network 52 in the state of FIG. 21. Meanwhile, the screen 230 is displayed in the support device 200 on the basis of an output from the master 150.

Referring to FIG. 22, the screen 230 includes information of slaves, the display of an incorrect location of a wiring, and the display of a handling method. When a user selects a "re-execute" button again after fixing a wiring, the master 150 applies the above-described detection data to the network 52 again and confirms the presence or absence of an incorrect wiring path again.

<F. Functional Configuration>

Figure 23:
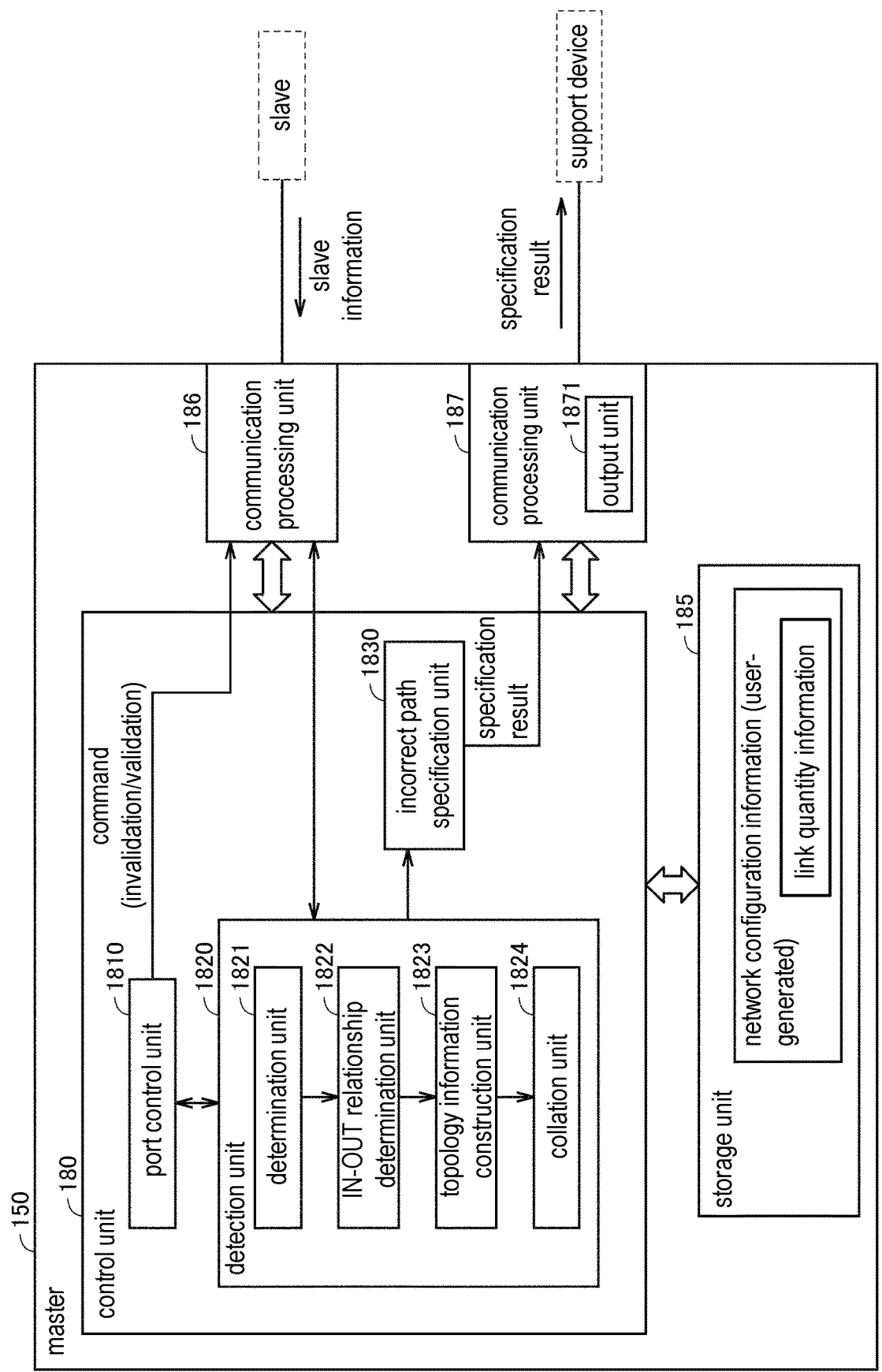
FIG. 23 is a diagram showing a functional configuration of a master.

FIG. 23 is a diagram showing a functional configuration of the master 150.

Referring to FIG. 23, the master 150 includes a control unit 180, a storage unit 185, a communication processing unit 186, and a communication processing unit 187. The communication processing unit 187 includes an output unit 1871.

The control unit 180 includes a port control unit 1810, a detection unit 1820, and an incorrect path specification unit 1830. The detection unit 1820 includes a determination unit 1821, an IN-OUT relationship determination unit 1822, a topology information construction unit 1823, and a collation unit 1824.

The communication processing unit 186 is an interface for transmitting and receiving data to and from a slave. The communication processing unit 187 is an interface for transmitting and receiving data to and from the support device 200. The output unit 1871 outputs data to the support device 200.

The port control unit 1810 invalidates a port in a valid state of a slave. In addition, the port control unit 1810 validates the invalidated port. In the present example, the port control unit 1810 invalidates and validates a port on the basis of an instruction given from the detection unit 1820.

In the present example, the port control unit 1810 invalidates and validates a port of a ring starting point slave and an output port of a slave which is paired with the port. In detail, the port control unit 1810 invalidates and validates a starting point port and a terminal point port of a ring starting point slave and output ports of slaves which are paired with the ports.

The detection unit 1820 detects a configuration of a network in a valid state of a port and an invalidated state of the port. Hereinafter, in the detection unit 1820, processing performed in both the states will be described.

The detection unit 1820 detects a configuration of a network using the above-described detection data. In detail, the detection unit 1820 acquires slave information from slaves constituting the network to detect a configuration of the network. Hereinafter, units constituting the detection unit 1820 will be described.

The determination unit 1821 determines whether or not the number of links obtained on the basis of slave information (the number of slaves detected) is consistent with the number of slaves in network configuration information stored in advance.

The IN-OUT relationship determination unit 1822 determines to which one of an "input from OUT to IN", an "input from IN to OUT", an "input from IN to IN", and an "input from OUT to OUT" a connection mode between two slaves connected to each other through a cable corresponds, on the basis of information of a time stamp.

The topology information construction unit 1823 constructs (detects) a configuration of a network on the basis of the detected slave information by using a determination result of the IN-OUT relationship determination unit 1822.

The collation unit 1824 collates whether the detected configuration of the network is consistent with network configuration information stored in advance.

A collation result is transmitted from the output unit 1871 to the support device 200 and is displayed in the support device 200.

The incorrect path specification unit 1830 specifies an incorrect wiring path in a network. The incorrect path specification unit 1830 specifies an incorrect wiring path between a starting point port and a terminal point port of a ring starting point slave on the basis of a configuration of a network detected when the terminal point port and the terminal point port of the ring starting point slave is valid and a configuration of a network detected when an output port of a slave which is paired with the terminal point port are invalidated. In more detail, the incorrect path specification unit 1830 specifies an incorrect wiring path between the starting point port and the terminal point port of the ring starting point slave on the basis of a configuration of a network detected when the terminal point port of the ring starting point slave and the output port of the slave which is paired with the terminal point port are valid, a configuration of a network detected when the terminal point port and the output port of the slave which is paired with the terminal point port are invalidated, and network configuration information stored in advance (see FIG. 2).

The output unit 1871 outputs information indicating the specified incorrect wiring path to the support device 200 outside the master. In this case, the incorrect wiring path is displayed in the support device 200 (see FIG. 15).

Typically, in a case where the determination unit 1821 determines that the number of links is not consistent with the number of slaves, the detection unit 1820 instructs the port control unit 1810 to invalidate the output port of the ring starting point slave. Typically, the detection unit 1820 instructs the port control unit 1810 to invalidate the terminal point port of the ring starting point slave. After the output port is invalidated, the detection unit 1820 acquires slave information from slaves constituting a network again by using the above-described detection data.

In a case where the determination result of the IN-OUT relationship determination unit 1822 is not correct (in a case where the detected configuration of the network is not consistent with network configuration information stored in advance), the detection unit 1820 instructs the port control unit 1810 to invalidate the output port of the ring starting point slave and the output port of the slave which is paired with the output port of the ring starting point slave.

As described above, the master 150 manages a plurality of slaves constituting a network including a ring topology. The plurality of slaves includes a first slave (ring starting point slave) serving as a starting point and a terminal point of a ring topology, and a plurality of second slaves which are connected between a first output port (for example, a starting point port) and a second output port (for example, a terminal point port) of a first slave device and constitute a ring topology.

The master 150 includes a detection unit 1820 that detects a configuration of a network on the basis of communication with a plurality of slave devices and a port control unit 1810 for invalidating the second output port. In addition, the master 150 includes an incorrect path specification unit 1830 that specifies an incorrect wiring path between the first output port and the second output port on the basis of a configuration of a network detected when the second output port is valid and a configuration of a network detected when the second output port is invalidated. In addition, the master 150 further includes an output unit 1871 that outputs information indicating the specified incorrect wiring path to the support device 200 outside the master device.

<G. Information of Slave>

FIG. 24 is a diagram showing slave information managed by the master 150.

Referring to FIG. 24, the master 150 manages a plurality of pieces of information for each of a plurality of slaves. Specifically, the master 150 stores a vendor ID, a production code, a revision, a serial number, a slave ID, PHY (physical layer) link information, a node address, and a time stamp of a port.

Hereinafter, slave information managed and acquired by the master 150 in a network will be described.

Figure 25:
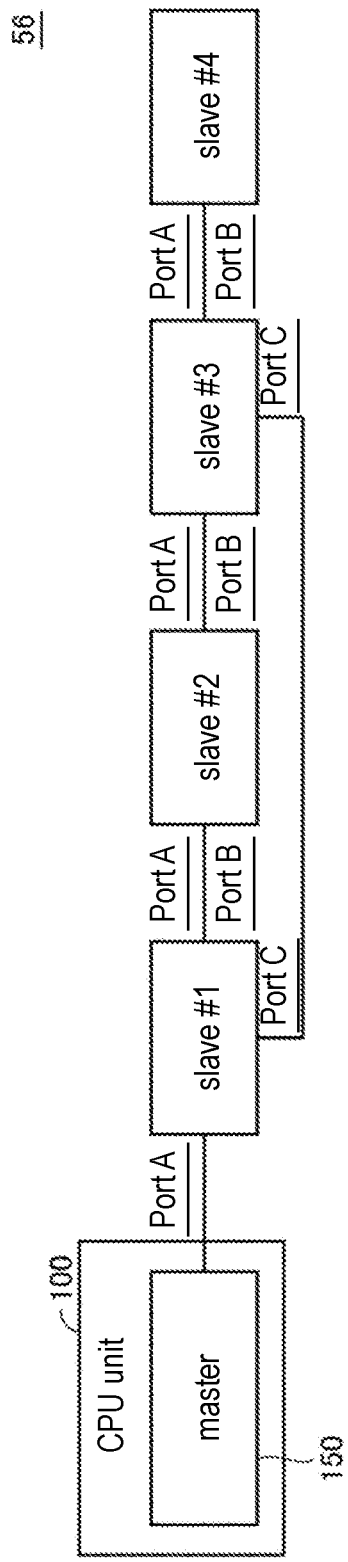
FIG. 25 is a diagram showing a network including a ring topology.

FIG. 25 is a diagram showing a network 56 including a ring topology. The state of FIG. 25 shows a state where there is no incorrect wiring path.

Referring to FIG. 25, the network 56 includes a CPU unit 100 including a master 150, and a plurality of slaves #1 to #4. A ring topology is constituted by the slaves #1. #2, and #3. The slave #1 and the slave #3 are branch slaves. In addition, the slave #1 functions as a ring starting point slave.

An output port of the master 150 is connected to an input port A of the slave #1 through a cable. An output port B (starting point port) of the slave #1 is connected to an input port A of the slave #2 through a cable. In addition, an output port C (terminal point port) of the slave #1 is connected to an output port C of the slave #3 through a cable.

An output port of the slave #2 is connected to an input port A of the slave #3 through a cable. An output port B of the slave #3 is connected to an input port A of the slave #4 through a cable.

FIG. 26 is a diagram showing data 720 of slaves managed by the master 150 in the network 56 having a connection relationship shown in FIG. 25.

Referring to FIG. 26, the master 150 detects four slaves #1 to #4 and stores slave information of the slaves. In the PHY link information (see FIG. 24) among the pieces of slave information, link states and open/close states (open or close) of the ports A to D are stored.

The link state indicates whether or not a cable is connected to a port. In the case of "LINK", the cable is connected to the port. In the case of "NOLINK", the cable is not connected to the port.

When the open/close state is "OPEN", the port is valid. When the open/close state is "CLOSE", the port is invalidated.

Further, in a time stamp (see FIG. 24) of the port among the pieces of slave information, the time when data has passed through each of the ports A to D is stored. Meanwhile, the master 150 acquires information of the time stamp from the slaves A to D.

Figure 27:
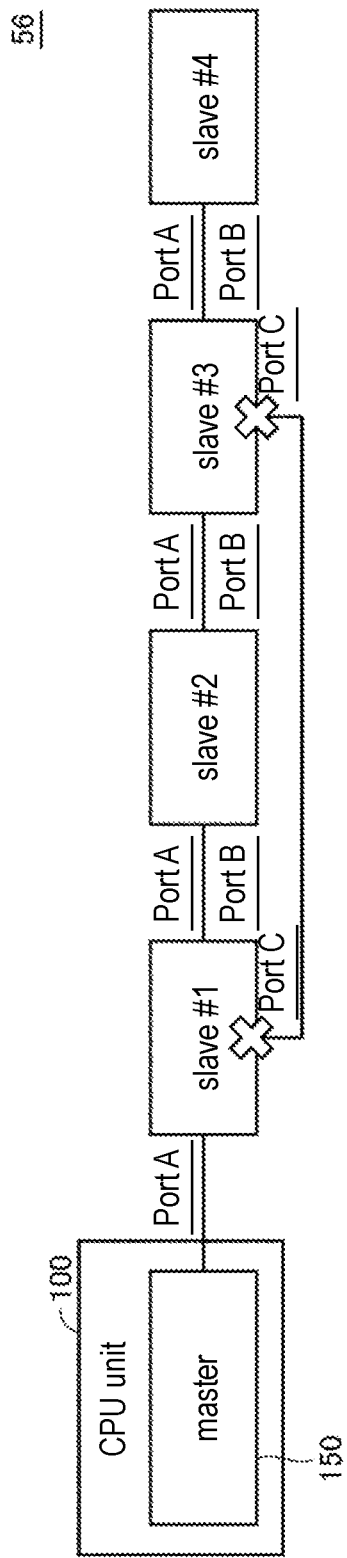
FIG. 27 is a diagram showing a state where an output port of a slave is invalidated in the network shown in FIG. 25.

FIG. 27 is a diagram showing a state where the output port C of the slave #1 and the output port C of the slave #3 are invalidated in the network 56 shown in FIG. 25.

Referring to FIG. 27, data which is input to the port B of the slave #3 is not output from the output port of the slave #3 and is output from the input port of the slave #3.

FIG. 28 is a diagram showing data 720 of slaves managed by the master 150 in the network 56 having a connection relationship shown in FIG. 27.

Referring to FIG. 28, the master 150 detects four slaves #1 to #4 and stores slave information of the slaves. Since the output port C of the slave #1 and the output port C of the slave #3 are invalidated, an item 751 of the port C in PHY link information of the data 720 is updated. Specifically. "LINK/OPEN" is updated to "LINK/CLOSE".

Figure 29:
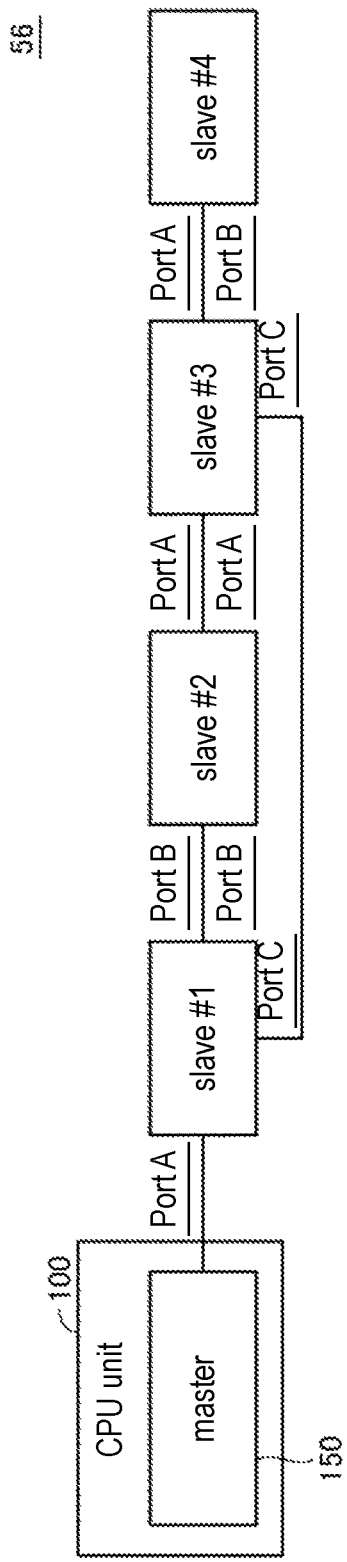
FIG. 29 is a diagram showing a state where an incorrect wiring path is formed in a network.

FIG. 29 is a diagram showing a state where an incorrect wiring path is formed in the network 56.

Referring to FIG. 29, in the present example, the incorrect wiring path includes a path connecting the output port of the slave #1 and the output port of the slave #2 and a path connecting the input port of the slave #2 and the input port of the slave #3. That is, in the present example, erroneous wiring for the input port A and the output port B of the slave #2 occurs.

In this configuration, the master 150 cannot detect the slave #2 by the incorrect wiring path.

FIG. 30 is a diagram showing data 720 of slaves managed by the master 150 in the network 56 having a connection relationship shown in FIG. 29.

Referring to FIG. 30, the master 150 detects three slaves #1, #3, and #4 and stores slave information of the slaves. However, the master 150 cannot detect the slave #2, and thus cannot acquire and manage slave information of the slave #2. Thus, in the data 720, there is no slave information of the slave #2.

Figure 31:
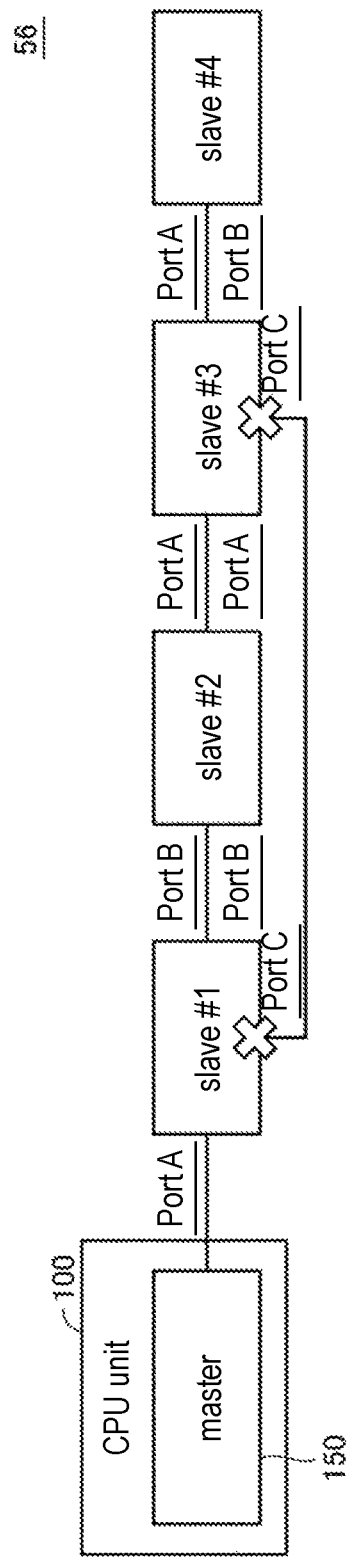
FIG. 31 is a diagram showing a state where an output port of a slave is invalidated in the network shown in FIG. 29.

FIG. 31 is a diagram showing a state where the output port C of the slave #1 and the output port C of the slave #3 are invalidated in the network 56 shown in FIG. 29.

Referring to FIG. 31, data which is input to the port B of the slave #3 is not output from the output port of the slave #3 and is output from the input port. In this case, the master 150 can detect the slave #2.

FIG. 32 is a diagram showing data 720 of slaves managed by the master 150 in the network 56 having a connection relationship shown in FIG. 31.

Referring to FIG. 32, the master 150 detects four slaves #1 to #4 and stores slave information of the slaves. That is, the master detects the slave #2 that has not been detected in a state before the output port C of the slave #1 is invalidated (as shown in FIG. 29, a state where the output port C of the slave #1 and the output port C of the slave #3 are valid) and also manages slave information of the slave #2.

Meanwhile, since the output port C of the slave #1 and the output port C of the slave #3 are invalidated, "LINK/OPEN" is updated to "LINK/CLOSE" in an item 751 of the port C in PHY link information of the data 720.

<H. Control Structure>

Figure 33:
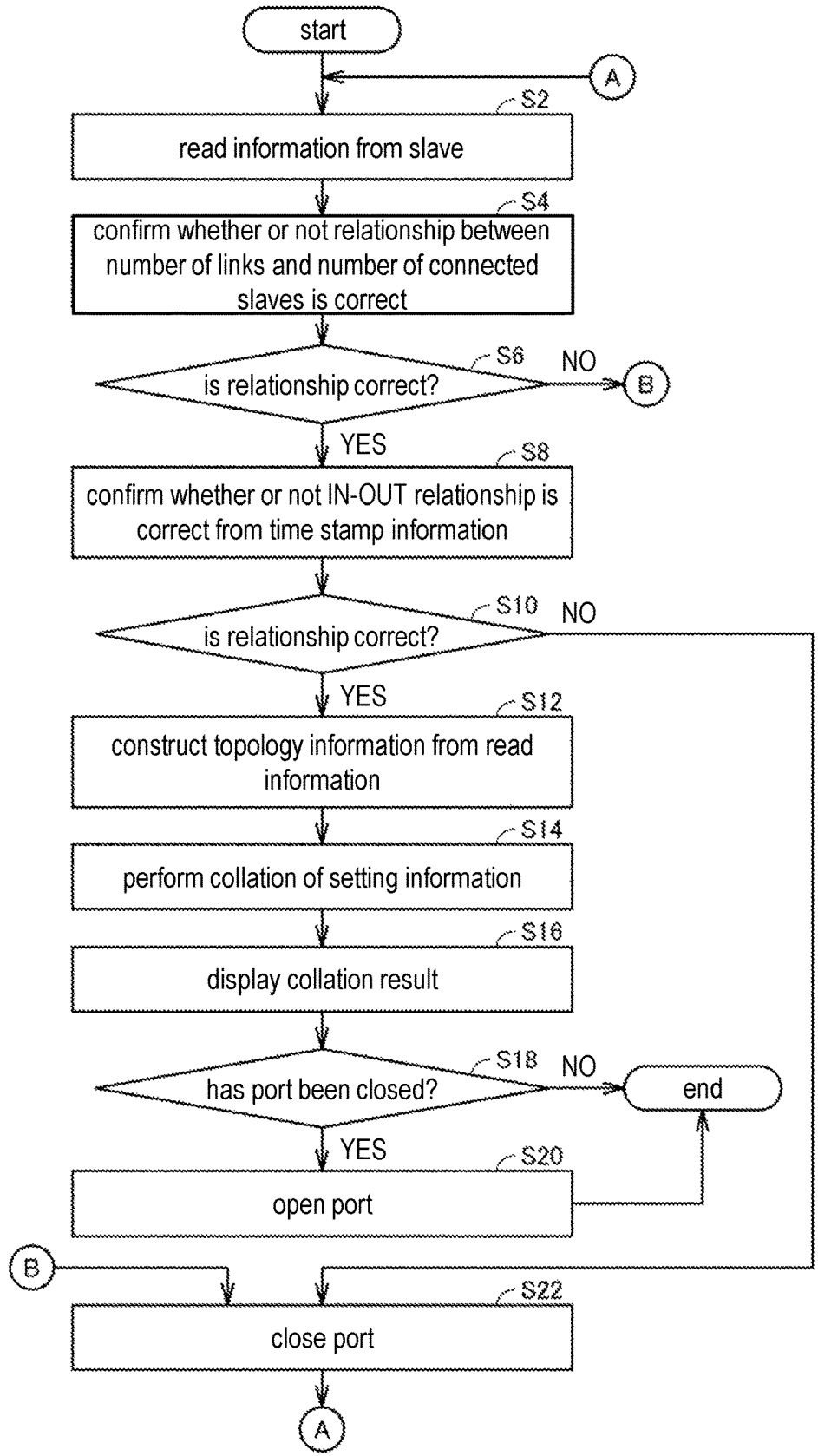
FIG. 33 is a flow diagram showing a flow of processing executed in a master.

FIG. 33 is a flow diagram showing a flow of processing executed in the master 150. Specifically, FIG. 33 is a diagram showing processing related to invalidation and validation of a port.

Referring to FIG. 33, in step S2, the master 150 reads information from a slave. In step S4, the master 150 confirms (determines) whether or not a relationship between the number of links and the number of connected slaves is correct.

In a case where the master 150 determines that the relationship is not correct (NO in step S6), the master causes the processing to proceed to step S22 and closes (invalidates) a target port (for example, a terminal point port) of a ring starting point slave and an output port of a slave which is paired with the target port of the ring starting point slave. In a case where the master 150 determines that the relationship is correct (YES in step S6), the master determines (confirms) in step S8 whether or not an IN-OUT relationship is correct on the basis of time stamp information.

In a case where the master 150 determines that an IN-OUT relationship is not correct (NO in step S10), the master causes the processing to proceed to step S22 and closes (invalidates) a target port (for example, a terminal point port) of a ring starting point slave and an output port of a slave which is paired with the target port of the ring starting point slave. In a case where the master 150 determines that the IN-OUT relationship is correct (YES in step S10), the master constructs topology information from information read from a slave in step S12.

In step S14, the master 150 collates the topology information with network configuration information stored in advance. In step S16, the master 150 displays a collation result in the support device 200.

In step S18, the master 150 confirms whether or not the above-described target port has been closed (invalidated). In a case where the port is closed (YES in step S18), the master 150 opens (validates) the port in step S20. In a case where the port is not closed (NO in step S18), the master 150 terminates a series of processes.

<Appendixes>

[1] A master device (150) that manages a plurality of slave devices constituting a network including a ring topology, the plurality of slave devices including a first slave device (310) serving as a starting point and a terminal point of the ring topology, and a plurality of second slave devices which are connected between a first output port and a second output port of the first slave device and constitute the ring topology, the master device including:

detection part (1820) for detecting a configuration of the network on the basis of communication with the plurality of slave devices;

port control part (1810) for invalidating the second output port and an output port of the second slave device which is paired with the second output port;

specification part (1830) for specifying an incorrect wiring path between the first output port and the second output port on the basis of a configuration of the network detected when the second output port and the output port of the second slave device which is paired with the second output port are valid, and a configuration of the network detected when the second output port and the output port of the second slave device which is paired with the second output port are invalidated; and output part (1871) for outputting information indicating the specified incorrect wiring path to an information processing device outside the master device.

[2] The master device according to configuration [1], wherein the first output port and the second output port are output ports of the first slave device (310), and the first output port is a starting point port of the ring topology, and the second output port is a terminal point port of the ring topology.

[3] The master device according to configuration [1] or [2], wherein the detection part (1820) detects a configuration of the network using predetermined detection data, and the detection data includes first data and second data for acquiring time stamp information indicating time at which the first data has passed through the plurality of second slave devices from each of the second slave devices.

[4] The master device according to configuration [3], wherein the detection part (1820) transmits the detection data on a condition that the master device (150) has been started up.

[5] The master device according to configuration [3], wherein the detection part (1820) transmits the detection data on a condition that it has been detected that new equipment has been added to the network.

[6] The master device according to any one of configurations [1] to [5],
wherein one of the plurality of second slave devices is a branch slave device (312) including an input port and a plurality of output ports, and the second slave device and a third slave device (314) that does not constitute the ring topology are able to be connected to each of the plurality of output ports,
in a case where the incorrect wiring path is not present, information of the third slave device (314) is included in the configuration of the network detected when the second output port and the output port of the second slave device which is paired with the second output port are valid, and the configuration of the network detected when the second output port and the output port of the second slave device which is paired with the second output port are invalidated, and
in a case where the incorrect wiring path is present, the information of the third slave device (314) is not included in the configuration of the network detected when the second output port and the output port of the second slave device which is paired with the second output port are valid, and the information of the third slave device (314) is included in the configuration of the network detected when the second output port and the output port of the second slave device which is paired with the second output port are invalidated.

[7] The master device according to any one of configurations [1] to [5],
wherein one slave device (322) among the second slave devices connected to each other through wirings is positioned closer to a starting point side of the ring topology than the other slave device,
in a case where a wiring path connecting the other slave device and the one slave device (322) is not incorrect, information of the one slave device (322) and information of the other slave device are included in the configuration of the network detected when the second output port and the output port of the second slave device which is paired with the second output port are valid and the configuration of the network detected when the second output port and the output port of the second slave device which is paired with the second output port are invalidated, and
in a case where the wiring path connecting the other slave device and the one slave device (322) is incorrect, the information of the one slave device (322) is not included in the configuration of the network detected when the second output port and the output port of the second slave device which is paired with the second output port are valid, and the information of the one slave device (322) and the information of the other slave device are included in the configuration of the network detected when the second output port and the output port of the second slave device which is paired with the second output port are invalidated.

[8] The master device according to any one of configurations [1] to [7],
wherein the network is an EtherCAT network.

[9] An arithmetic processing device (100) including the master device (150) according to any one of configurations [1] to [8].

[10] A programmable logic controller (10) including the arithmetic processing device (100) according to configuration [9].

[11] A network including a ring topology, the network including:
a plurality of slave devices that constitutes the network;
a master device (150) that manages the plurality of slave devices; and
an information processing device (200) that is communicatively connected to the master device,
wherein the plurality of slave devices includes a first slave device (310) serving as a starting point and a terminal point of the ring topology, and a plurality of second slave devices which are connected between a first output port and a second output port of the first slave device and constitute the ring topology,
the master device (150) detects a configuration of the network on the basis of communication with the plurality of slave devices, is able to invalidate the second output port and an output port of the second slave device which is paired with the second output port, specifies an incorrect wiring path between the first output port and the second output port on the basis of a configuration of the network detected when the second output port and the output port of the second slave device which is paired with the second output port are valid, and a configuration of the network detected when the second output port and the output port of the second slave device which is paired with the second output port are invalidated, and outputs information indicating the specified incorrect wiring path to the information processing device (200), and
the information processing device (200) displays the incorrect wiring path.

[12] An information processing method in a master device (150) that manages a plurality of slave devices constituting a network including a ring topology, the plurality of slave devices including a first slave device (310) serving as a starting point and a terminal point of the ring topology, and a plurality of second slave devices which are connected between a first output port and a second output port of the first slave device and constitute the ring topology, the information processing method including:
a step of causing the master device (150) to detect a configuration of the network on the basis of communication with the plurality of slave devices;
a step of causing the master device (150) to invalidate the second output port and an output port of the second slave device which is paired with the second output port;
a step of causing the master device (150) to specify an incorrect wiring path between the first output port and the second output port on the basis of a configuration of the network detected when the second output port and the output port of the second slave device which is paired with the second output port are valid, and a configuration of the network detected when the second output port and the output port of the second slave device which is paired with the second output port are invalidated; and
a step of causing the master device (150) to output information indicating the specified incorrect wiring path to an information processing device outside the master device.

It should be considered that the embodiment disclosed this time is exemplary in all respects and not restrictive. The scope of the present invention is shown by the claims rather than the description of the embodiment described above, and is intended to include meaning equivalent to the claims and all modifications within the scope.

The invention claimed is:

1. A master device that manages a plurality of slave devices constituting a network comprising a ring topology, the plurality of slave devices comprising a first slave device serving as a starting point and a terminal point of the ring topology, and a plurality of second slave devices which are connected between a first output port and a second output port of the first slave device and constitute the ring topology, the master device comprising:
a processor, configured to:
detect a configuration of the network on the basis of communication with the plurality of slave devices;
invalidate the second output port and an output port of the second slave device which is paired with the second output port;
specify an incorrect wiring path between the first output port and the second output port on the basis of the configuration of the network detected when the second output port and the output port of the second slave device which is paired with the second output port are valid, and the configuration of the network detected when the second output port and the output port of the second slave device which is paired with the second output port are invalidated; and
an interface for outputting information indicating the specified incorrect wiring path to an information processing device outside the master device.

2. The master device according to claim 1, wherein the first output port and the second output port are output ports of the first slave device, and
the first output port is a starting point port of the ring topology, and the second output port is a terminal point port of the ring topology.

3. The master device according to claim 1, wherein the processor detects the configuration of the network using predetermined detection data, and
the detection data comprises first data and second data for acquiring time stamp information indicating a time at which the first data has passed through the plurality of second slave devices from each of the second slave devices.

4. The master device according to claim 3, wherein the processor transmits the detection data on a condition that the master device has been started up.

5. The master device according to claim 3, wherein the processor transmits the detection data on a condition that it has been detected that new equipment has been added to the network.

6. The master device according to claim 1, wherein one of the plurality of second slave devices is a branch slave device comprising an input port and a plurality of output ports, and the second slave device and a third slave device that does not constitute the ring topology are able to be connected to each of the plurality of output ports,
in a case where the incorrect wiring path is not present, information of the third slave device is comprised in the configuration of the network detected when the second output port and the output port of the second slave device which is paired with the second output port are valid, and the configuration of the network detected when the second output port and the output port of the second slave device which is paired with the second output port are invalidated, and
in a case where the incorrect wiring path is present, the information of the third slave device is not comprised in the configuration of the network detected when the second output port and the output port of the second slave device which is paired with the second output port are valid, and the information of the third slave device is comprised in the configuration of the network detected when the second output port and the output port of the second slave device which is paired with the second output port are invalidated.

7. The master device according to claim 1, wherein one slave device among the second slave devices connected to each other through wirings is positioned closer to a starting point side of the ring topology than the other slave device,
in a case where a wiring path connecting the other slave device and the one slave device is not incorrect, information of the one slave device and information of the other slave device are comprised in the configuration of the network detected when the second output port and the output port of the second slave device which is paired with the second output port are valid and the configuration of the network detected when the second output port and the output port of the second slave device which is paired with the second output port are invalidated, and
in a case where the wiring path connecting the other slave device and the one slave device is incorrect, the information of the one slave device is not comprised in the configuration of the network detected when the second output port and the output port of the second slave device which is paired with the second output port are valid, and the information of the one slave device and the information of the other slave device are comprised in the configuration of the network detected when the second output port and the output port of the second slave device which is paired with the second output port are invalidated.

8. The master device according to claim 1, wherein the network is an EtherCAT network.

9. An arithmetic processing device comprising the master device according to claim 1.

10. A programmable logic controller comprising the arithmetic processing device according to claim 9.

11. A network comprising a ring topology, the network comprising:
a plurality of slave devices that constitutes the network;
a master device that manages the plurality of slave devices; and
an information processing device that is communicatively connected to the master device,
wherein the plurality of slave devices comprises a first slave device serving as a starting point and a terminal point of the ring topology, and a plurality of second slave devices which are connected between a first output port and a second output port of the first slave device and constitute the ring topology,
the master device detects a configuration of the network on the basis of communication with the plurality of slave devices, is able to invalidate the second output port and an output port of the second slave device which is paired with the second output port, specifies an incorrect wiring path between the first output port and the second output port on the basis of the configuration of the network detected when the second output port and the output port of the second slave device which is paired with the second output port are valid, and the configuration of the network detected when the second output port and the output port of the second slave device which is paired with the second output port are invalidated, and outputs information indicating the specified incorrect wiring path to the information processing device, and the information processing device displays the incorrect wiring path.

12. An information processing method in a master device that manages a plurality of slave devices constituting a network comprising a ring topology, the plurality of slave devices comprising a first slave device serving as a starting point and a terminal point of the ring topology, and a plurality of second slave devices which are connected between a first output port and a second output port of the first slave device and constitute the ring topology, the information processing method comprising:
- a step of causing the master device to detect a configuration of the network on the basis of communication with the plurality of slave devices;
- a step of causing the master device to invalidate the second output port and an output port of the second slave device which is paired with the second output port;
- a step of causing the master device to specify an incorrect wiring path between the first output port and the second output port on the basis of the configuration of the network detected when the second output port and the output port of the second slave device which is paired with the second output port are valid, and the configuration of the network detected when the second output port and the output port of the second slave device which is paired with the second output port are invalidated; and
- a step of causing the master device to output information indicating the specified incorrect wiring path to an information processing device outside the master device.

13. The master device according to claim 2,
wherein the processor detects the configuration of the network using predetermined detection data, and
the detection data comprises first data and second data for acquiring time stamp information indicating a time at which the first data has passed through the plurality of second slave devices from each of the second slave devices.

14. The master device according to claim 2,
wherein one of the plurality of second slave devices is a branch slave device comprising an input port and a plurality of output ports, and the second slave device and a third slave device that does not constitute the ring topology are able to be connected to each of the plurality of output ports,
in a case where the incorrect wiring path is not present, information of the third slave device is comprised in the configuration of the network detected when the second output port and the output port of the second slave device which is paired with the second output port are valid, and the configuration of the network detected when the second output port and the output port of the second slave device which is paired with the second output port are invalidated, and
in a case where the incorrect wiring path is present, the information of the third slave device is not comprised in the configuration of the network detected when the second output port and the output port of the second slave device which is paired with the second output port are valid, and the information of the third slave device is comprised in the configuration of the network detected when the second output port and the output port of the second slave device which is paired with the second output port are invalidated.

15. The master device according to claim 3,
wherein one of the plurality of second slave devices is a branch slave device comprising an input port and a plurality of output ports, and the second slave device and a third slave device that does not constitute the ring topology are able to be connected to each of the plurality of output ports,
in a case where the incorrect wiring path is not present, information of the third slave device is comprised in the configuration of the network detected when the second output port and the output port of the second slave device which is paired with the second output port are valid, and the configuration of the network detected when the second output port and the output port of the second slave device which is paired with the second output port are invalidated, and
in a case where the incorrect wiring path is present, the information of the third slave device is not comprised in the configuration of the network detected when the second output port and the output port of the second slave device which is paired with the second output port are valid, and the information of the third slave device is comprised in the configuration of the network detected when the second output port and the output port of the second slave device which is paired with the second output port are invalidated.

16. The master device according to claim 2,
wherein one slave device among the second slave devices connected to each other through wirings is positioned closer to a starting point side of the ring topology than the other slave device,
in a case where a wiring path connecting the other slave device and the one slave device is not incorrect, information of the one slave device and information of the other slave device are comprised in the configuration of the network detected when the second output port and the output port of the second slave device which is paired with the second output port are valid and the configuration of the network detected when the second output port and the output port of the second slave device which is paired with the second output port are invalidated, and
in a case where the wiring path connecting the other slave device and the one slave device is incorrect, the information of the one slave device is not comprised in the configuration of the network detected when the second output port and the output port of the second slave device which is paired with the second output port are valid, and the information of the one slave device and the information of the other slave device are comprised in the configuration of the network detected when the second output port and the output port of the second slave device which is paired with the second output port are invalidated.

17. The master device according to claim 3,
wherein one slave device among the second slave devices connected to each other through wirings is positioned closer to a starting point side of the ring topology than the other slave device,
in a case where a wiring path connecting the other slave device and the one slave device is not incorrect, information of the one slave device and information of the other slave device are comprised in the configuration of the network detected when the second output port and the output port of the second slave device which is paired with the second output port are valid and the configuration of the network detected when the second output port and the output port of the second slave device which is paired with the second output port are invalidated, and in a case where the wiring path connecting the other slave device and the one slave device is incorrect, the information of the one slave device is not comprised in the configuration of the network detected when the second output port and the output port of the second slave device which is paired with the second output port are valid, and the information of the one slave device and the information of the other slave device are comprised in the configuration of the network detected when the second output port and the output port of the second slave device which is paired with the second output port are invalidated.

18. The master device according to claim 2, wherein the network is an EtherCAT network.

19. The master device according to claim 3, wherein the network is an EtherCAT network.

20. The master device according to claim 4, wherein the network is an EtherCAT network.

* * * * *